United States Patent
Kunugise

(10) Patent No.: US 8,654,451 B2
(45) Date of Patent: Feb. 18, 2014

(54) VARIABLE MAGNIFICATION OPTICAL SYSTEM AND IMAGING APPARATUS

(71) Applicant: Fujifilm Corporation, Tokyo (JP)

(72) Inventor: Takashi Kunugise, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/965,481

(22) Filed: Aug. 13, 2013

(65) Prior Publication Data

US 2013/0329305 A1    Dec. 12, 2013

Related U.S. Application Data

(63) Continuation of application No. PCT/JP2012/001335, filed on Feb. 28, 2012.

(30) Foreign Application Priority Data

Feb. 28, 2011  (JP) ................... 2011-041470
Oct. 13, 2011  (JP) ................... 2011-225616

(51) Int. Cl.
  *G02B 15/14*  (2006.01)
(52) U.S. Cl.
  USPC .......................................................... 359/691
(58) Field of Classification Search
  USPC .......................................................... 359/691
  See application file for complete search history.

(56) References Cited

U.S. PATENT DOCUMENTS

| | | |
|---|---|---|
| 2004/0257670 A1 | 12/2004 | Kawakami |
| 2007/0041101 A1 | 2/2007 | Goosey, Jr. et al. |
| 2007/0047096 A1 | 3/2007 | Ito et al. |
| 2008/0019021 A1 | 1/2008 | Kawakami et al. |
| 2008/0212203 A1 | 9/2008 | Taguchi et al. |
| 2009/0219626 A1 | 9/2009 | Tomioka |
| 2011/0141575 A1 | 6/2011 | Muratani et al. |
| 2011/0164324 A1* | 7/2011 | Okumura ................. 359/682 |

FOREIGN PATENT DOCUMENTS

| | | |
|---|---|---|
| JP | 52-020018 | 2/1977 |
| JP | 4-163414 | 6/1992 |
| JP | 7-035975 | 2/1995 |
| JP | 8-320435 | 12/1996 |
| JP | 11-084237 | 3/1999 |
| JP | 2003-344764 | 12/2003 |
| JP | 2004-271668 | 9/2004 |
| JP | 2005-062771 | 3/2005 |
| JP | 2007-094371 | 4/2007 |

(Continued)

OTHER PUBLICATIONS

International Search Report, PCT/JP2012/001335, Jun. 5, 2012.

*Primary Examiner* — James Jones

(74) *Attorney, Agent, or Firm* — Young & Thompson

(57) ABSTRACT

A variable magnification optical system consists of first lens group having negative refractive power and second lens group having positive refractive power, which are in this order from an object side, and a distance in an optical axis direction between the first lens group and the second lens group changes when magnification is changed. The second lens group consists of a positive sixth lens, a negative seventh lens, a positive eighth lens, and a cemented lens composed of a negative ninth lens and a positive tenth lens cemented together, which are in this order from the object side, and all of the three positive lenses, which are the sixth lens, the eighth lens and the tenth lens, are double-convex lenses. A predetermined formula is satisfied.

17 Claims, 25 Drawing Sheets

(56) References Cited

FOREIGN PATENT DOCUMENTS

| JP | 2008-026750 | 2/2008 |
| JP | 2008-216591 | 9/2008 |
| JP | 2009-505166 | 2/2009 |
| JP | 2009-230122 | 10/2009 |
| JP | 2009-271165 | 11/2009 |
| JP | 2010-044228 | 2/2010 |
| JP | 2011-018009 | 1/2011 |
| JP | 2011-141364 | 7/2011 |

* cited by examiner

EXAMPLE 11

VARIABLE MAGNIFICATION OPTICAL SYSTEM AND IMAGING APPARATUS

BACKGROUND OF THE INVENTION

1. Field of the Invention

The present invention relates to a variable magnification optical system used in a video camera, an electronic still camera or the like, and an imaging apparatus. In particular, the present invention relates to a variable magnification optical system that can be used in a wide wavelength range of from a visible wavelength band through a near-infrared wavelength band, and an imaging apparatus including the variable magnification optical system.

2. Description of the Related Art

Conventionally, surveillance cameras have been used for preventing crimes, recording or the like. An optical system for such a surveillance camera needs to be small and structurable at low cost. Further, the optical system needs to have a large relative aperture to identify a subject even in low illumination photography conditions, and also to have a wide angle of view so that a wide range can be photographed. The optical system also needs to have high optical performance. Further, since a demand for a surveillance camera with a variable magnification function has increased in recent years, a variable magnification optical system is becoming a main trend, and such an optical system also needs to have a high variable magnification ratio.

When an optical system is mounted on a surveillance camera used for both day and night, such a surveillance camera is often set at facilities without any people, and photography with visible light is performed during the daytime and photography with near-infrared light is performed at night. Therefore, the optical system needs to excellently correct chromatic aberrations for a wide wavelength range including a visible wavelength band through a near-infrared wavelength band. Especially, excellent correction of longitudinal chromatic aberrations is demanded.

As a zoom lens for a camera used in the aforementioned fields, for example, a two-group zoom lens consists of a negative first lens group and a positive second lens group is known (please refer to U.S. Patent Application Publication No. 20070047096 (Patent Document 1), Japanese Unexamined Patent Publication No. 2009-271165 (Patent Document 2), and U.S. Patent Application Publication No. 20080212203 (Patent Document 3)). Patent Document 1 discloses a zoom lens in which a first lens group consists of a negative lens, a negative lens, a negative lens, and a cemented lens of a positive lens and a negative lens cemented together, which are in this order from an object side. Patent Document 2 discloses a zoom lens in which a first lens group consists of a negative lens, a negative lens, a negative lens, a positive lens and a negative lens in this order from an object side, and in which a double-concave lens is arranged on the most image side in the first lens group. Patent Document 3 discloses a zoom lens in which a first lens group consists of a negative lens, a negative lens, a negative lens, a positive lens and a positive lens in this order from an object side.

SUMMARY OF THE INVENTION

Both of the two-group zoom lenses disclosed in Patent Documents 1 and 2 have full angles of view of about 180°, but variable magnification ratios are low. Therefore, they do not satisfy the demand of recent years. The full angle of view of the zoom lens disclosed in Patent Document 3 is only about 120°, and the zoom lens is disadvantageous in cost because two or more aspherical lenses are used. Further, the zoom lenses disclosed in Patent Documents 1 through 3 do not necessarily assume use in a wide wavelength range including a visible wavelength band through a near-infrared wavelength band.

In view of the foregoing circumstances, it is an object of the present invention to provide a high performance variable magnification optical system that has both a wide angle of view and a high magnification ratio, and that is small and structurable at low cost, and that can be used in a wide wavelength range including a visible wavelength band through a near-infrared wavelength band. Further, it is another object of the invention to provide an imaging apparatus including the variable magnification optical system.

A first variable magnification optical system of the present invention is a variable magnification optical system consisting of:

a first lens group having negative refractive power; and a second lens group having positive refractive power, which are in this order from an object side, and a distance in an optical axis direction between the first lens group and the second lens group being changed when magnification is changed, wherein a negative meniscus lens having a concave object-side surface is arranged on the most image side in the first lens group, and wherein the following formula (1) is satisfied:

$$0.5 < d45/d5 < 3.0 \qquad (1),\text{ where}$$

$d5$: a thickness of the negative meniscus lens on an optical axis, and $d45$: a distance in air on the optical axis between the negative meniscus lens and a lens immediately on the object side of the negative meniscus lens.

In the first variable magnification optical system of the present invention, it is more desirable that the following formula (1-1) is satisfied instead of the formula (1). It is even more desirable that the following formula (1-2) is satisfied:

$$0.88 < d45/d5 < 1.82 \qquad (1\text{-}1);\text{ and}$$

$$1.1 < d45/d5 < 1.4 \qquad (1\text{-}2).$$

In the first variable magnification optical system of the present invention, it is desirable that the following formula (2) is satisfied. It is more desirable that the following formula (2-1) is satisfied, and it is even more desirable that the following formula (2-2) is satisfied:

$$0.05 < d45/LG1 < 0.15 \qquad (2);$$

$$0.05 < d45/LG1 < 0.1 \qquad (2\text{-}1);\text{ and}$$

$$0.06 < d45/LG1 < 0.08 \qquad (2\text{-}2),\text{ where}$$

$LG1$: a thickness, on the optical axis, from a most-object-side surface in the first lens group to a most-image-side surface in the first lens group.

In the first variable magnification optical system of the present invention, it is desirable that the following formula (3) is satisfied. It is more desirable that the following formula (3-1) is satisfied, and it is even more desirable that the following formula (3-2) is satisfied:

$$5.5 < f5/fG1 < 12.0 \qquad (3);$$

$$5.5 < f5/fG1 < 9.3 \qquad (3\text{-}1);\text{ and}$$

$$7.5 < f5/fG1 < 8.5 \qquad (3\text{-}2),\text{ where}$$

fG1: a focal length of the first lens group, and f5: a focal length of the negative meniscus lens on the most image side in the first lens group.

A second variable magnification optical system of the present invention is a variable magnification optical system consisting of:

a first lens group having negative refractive power; and a second lens group having positive refractive power, which are in this order from an object side, and a distance in an optical axis direction between the first lens group and the second lens group being changed when magnification is changed, wherein the first lens group consists of a first lens that is a negative meniscus lens having a concave image-side surface, a negative second lens having a concave image-side surface, and the absolute value of the curvature radius of the image-side surface of the second lens being less than the absolute value of the curvature radius of an object-side surface of the second lens, a cemented lens composed of a negative third lens and a positive fourth lens cemented together, and a fifth lens that is a negative meniscus lens having a concave object-side surface, which are in this order from the object side.

In the second variable magnification optical system of the present invention, it is desirable that the following formula (4) is satisfied, and it is more desirable that the following formula (4-1) is satisfied:

$$0.8 < (R3-R4)/(R3+R4) < 1.5 \quad (4); \text{ and}$$

$$0.9 < (R3-R4)/(R3+R4) < 1.2 \quad (4\text{-}1), \text{ where}$$

R3: the curvature radius of the object-side surface of the second lens, and

R4: the curvature radius of the image-side surface of the second lens.

A third variable magnification optical system of the present invention is a variable magnification optical system consisting of:

a first lens group having negative refractive power; and a second lens group having positive refractive power, which are in this order from an object side, and a distance in an optical axis direction between the first lens group and the second lens group being changed when magnification is changed, wherein the second lens group consists of a positive sixth lens, a negative seventh lens, a positive eighth lens, and a cemented lens composed of a negative ninth lens and a positive tenth lens cemented together, which are in this order from the object side, and wherein all of the three positive lenses, which are the sixth lens, the eighth lens and the tenth lens, are double-convex lenses, and wherein at least two of the three positive lenses in the second lens group satisfy the following formulas (5) and (6):

$$80.0 < vd \quad (5); \text{ and}$$

(6) when a partial dispersion ratio $\theta gF$ for g-line and F-line is defined as $\theta gF = (Ng-NF)/(NF-NC)$, where vd: an Abbe number for d-line, and Ng, Nd, NF and NC: refractive indices for g-line, d-line, F-line and C-line, respectively.

In the third variable magnification optical system of the present invention, it is desirable that the following formulas (7) through (9) are satisfied:

$$60.0 < vd7+vd9 < 85.0 \quad (7);$$

$$vd7 > vd9 \quad (8); \text{ and}$$

$$2.0 < f7/f9 < 4.5 \quad (9), \text{ where}$$

vd7, f7: an Abbe number of the seventh lens for d-line and a focal length of the seventh lens, respectively, and vd9, f9: an Abbe number of the ninth lens for d-line and a focal length of the ninth lens, respectively.

In the third variable magnification optical system, it is more desirable that the following formulas (7-1) is satisfied instead of the formula (7):

$$65.0 < vd7+vd9 < 80.0 \quad (7\text{-}1).$$

In the third variable magnification optical system of the present invention, it is more desirable that the following formula (9-1) is satisfied instead of the formula (9):

$$2.0 < f7/f9 < 3.6 \quad (9\text{-}1).$$

In the first through third variable magnification optical systems of the present invention, it is desirable that a variable magnification ratio from a wide-angle end to a telephoto end is greater than or equal to 2.6 times.

In the first through third variable magnification optical systems of the present invention, it is desirable that a most object side lens in the second lens group is an aspherical lens, and all of the other lenses in the entire system are spherical lenses.

In the variable magnification optical systems of the present invention, the phrase "consists of" and the phrase "consisting of" mean substantial composition. Therefore, the variable magnification optical systems of the present invention may include a lens that substantially does not have any power, an optical element other than lenses, such as a stop and a cover glass, and the like besides the mentioned lens groups and lenses.

In the variable magnification optical systems of the present invention, the shape of a lens surface and the sign of refractive power are considered in a paraxial region when an aspherical surface is included.

The sign of a curvature radius is positive when the shape of a surface is convex toward the object side, and negative when the shape of a surface is convex toward the image side.

An imaging apparatus of the present invention includes the variable magnification optical system of the present invention.

The first variable magnification optical system of the present invention consists of a negative first lens group and a positive second lens group in this order from an object side, and a distance in an optical axis direction between the first lens group and the second lens group changes when magnification is changed. In the optical system, a negative meniscus lens having a concave object-side surface is arranged on the most image side in the first lens group, and the ratio of a distance in air immediately on the object side of the negative meniscus lens to the center thickness of the negative meniscus lens is appropriately set. Therefore, it is possible to realize a high performance variable magnification optical system that has both a wide angle of view and a high magnification ratio, and that is small and structurable at low cost, and that can efficiently correct chromatic aberrations for a wide wavelength range including a visible wavelength band through a near-infrared wavelength band.

The second variable magnification optical system of the present invention consists of a negative first lens group and a positive second lens group in this order from an object side, and a distance in an optical axis direction between the first lens group and the second lens group changes when magnification is changed. In the optical system, the refractive power and the shape of each lens constituting the first lens group are appropriately set in detail. Therefore, it is possible to realize a high performance variable magnification optical system that has both a wide angle of view and a high magnification ratio, and that is small and structurable at low cost, and that can efficiently correct chromatic aberrations for a wide wavelength range including a visible wavelength band through a near-infrared wavelength band.

The third variable magnification optical system of the present invention consists of a negative first lens group and a positive second lens group in this order from an object side, and a distance in an optical axis direction between the first lens group and the second lens group changes when magnification is changed. In the optical system, the refractive power and the shape of each lens constituting the second lens group are appropriately set. Further, dispersion characteristics about positive lenses in the second lens group are appropriately set. Therefore, it is possible to realize a high performance variable magnification optical system that has both a wide angle of view and a high magnification ratio, and that is small and structurable at low cost, and that can efficiently correct chromatic aberrations for a wide wavelength range including a visible wavelength band through a near-infrared wavelength band.

The imaging apparatus of the present invention includes the variable magnification optical system of the present invention. Therefore, the imaging apparatus is small and structurable at low cost. Imaging at a wide angle of view and at a high magnification ratio is possible, and excellent images are obtainable in a wide wavelength range including a visible wavelength band through a near-infrared wavelength band.

DESCRIPTION OF THE PREFERRED EMBODIMENTS

Figure 1:
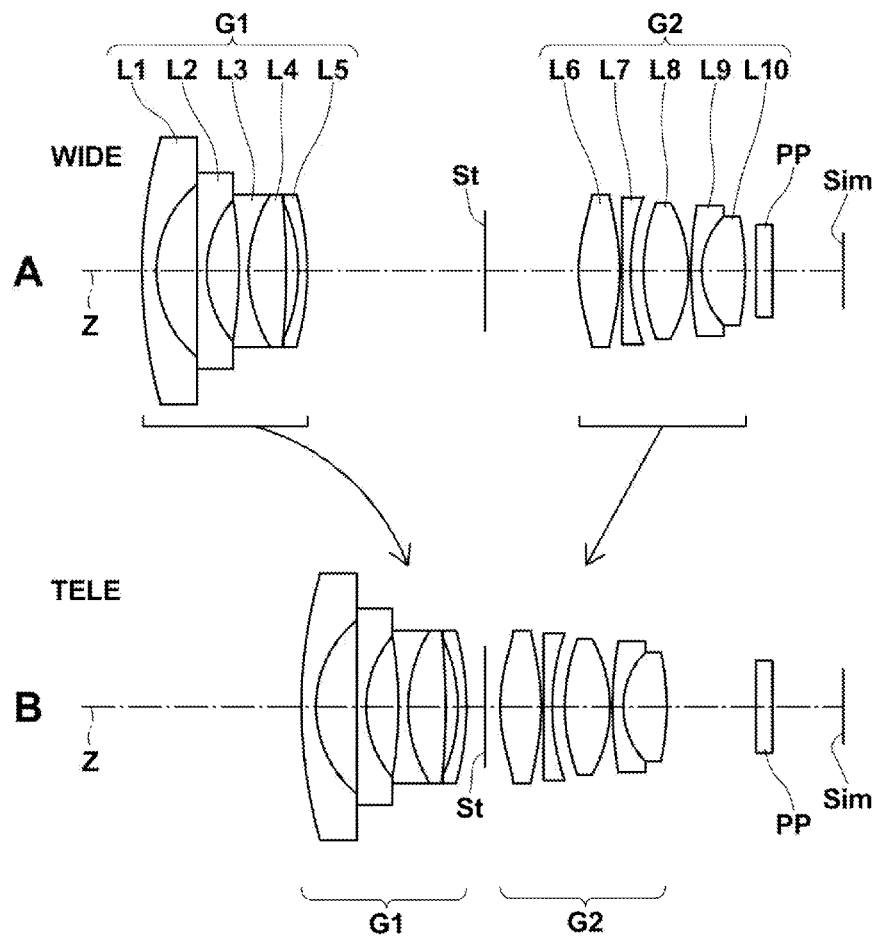
FIG. 1, Sections A and B are cross sections illustrating the lens structure of a variable magnification optical system in Example 1 of the present invention at a wide-angle end and at telephoto end, respectively.

Hereinafter, embodiments of the present invention will be described in detail with reference to drawings. FIG. 1, Sections A and B are cross sections of a variable magnification optical system according to an embodiment of the present invention. As the term "Example 1" is written at the top of FIG. 1, Section A, the structure example illustrated in FIG. 1, Sections A and B corresponds to a variable magnification optical system in Example 1, which will be described later. Here, with reference to the structure example illustrated in FIG. 1, Sections A and B, a variable magnification optical system according to an embodiment of the present invention will be described.

This variable magnification optical system consists of first lens group G1 having negative refractive power and second lens group G2 having positive refractive power, which are in this order from an object side. A distance in an optical axis direction between first lens group G1 and second lens group G2 changes when magnification is changed. FIG. 1, Sections A and B illustrate the arrangement of lenses of the variable magnification optical system at a wide-angle end and at a telephoto end, respectively, when the optical system is focused on an object at infinity. The left side of the drawings is the object side, and the right side of the drawings is the image side. Further, arrows between FIG. 1, Sections A and B schematically indicate movement paths of lens groups that move as magnification is changed.

When a variable magnification optical system is mounted on an imaging apparatus, it is desirable that the imaging apparatus includes a cover glass for protecting an imaging plane of an imaging device, and a prism, such as a color separation prism, and various filters, such as a low-pass filter and an infrared ray cut filter, based on the specification of the imaging apparatus. FIG. 1, Sections A and B illustrate an example in which parallel-flat-plate-shaped optical member PP, which is assumed to be such elements, is arranged between second lens group G2 and image plane Sim.

In the example illustrated in FIG. 1, aperture stop St is located between first lens group G1 and second lens group G2, and fixed while magnification is changed. Aperture stop St illustrated in FIG. 1, Sections A and B does not represent the size nor the shape of the aperture stop St, but the position of the aperture stop St on optical axis Z.

The variable magnification optical system of the present embodiment consists of two lens groups, and the arrangement of power is negative and positive in this order from the object side. Further, magnification is changed by variation of a distance between first lens group G1 and second lens group G2. Such a structure is advantageous in widening an angle of view.

First lens group G1 may have a five-lens structure, for example, as illustrated in FIG. 1, Section A. In FIG. 1, Section A, first lens L1, second lens L2, a cemented lens of negative third lens L3 and positive fourth lens L4 cemented together, and fifth lens L5 are arranged in this order from the object side. The first lens L1 is a negative meniscus lens having a concave image-side surface, and the second lens L2 is a negative lens having a concave image-side surface, and the absolute value of the curvature radius of the image-side surface of the second lens L2 is less than the absolute value of the curvature radius of the object-side surface of the second lens L2. Further, the fifth lens L5 is a negative meniscus lens having a concave object-side surface.

Further, second lens group G2 may have a five-lens structure, for example, as illustrated in FIG. 1, Section A. In FIG. 1, Section A, positive sixth lens L6, negative seventh lens L7, positive eighth lens L8, and a cemented lens of negative ninth lens L9 and positive tenth lens L10 cemented together are arranged in this order from the object side.

When three negative lenses are arranged on the object side in first lens group G1, as described above, such a structure is advantageous in widening an angle of view. Further, when each of first lens group G1 and second lens group G2 includes a cemented lens composed of a negative lens and a positive lens cemented together, such a structure is advantageous in correction of chromatic aberrations.

In the variable magnification optical system of the present embodiment, it is desirable that both of first lens group G1 and second lens group G2 have five-lens structures to reduce the size of the optical system and to lower the cost. Further, in first lens group G1 consisting of first lens L1 through fifth lens L5, as described above, when third lens L3 is a double-concave lens and fourth lens L4 is a double-convex lens, it is possible to correct chromatic aberrations in an excellent manner. Further, in second lens group G2 consisting of sixth lens L6 through tenth lens L10, as described above, it is desirable that ninth lens L9 is a negative meniscus lens having a concave image-side surface. In such a case, it is possible to correct a longitudinal chromatic aberration in an excellent manner.

When a negative meniscus lens (fifth lens L5 in the example of FIG. 1, Section A) having a concave object-side surface is arranged on the most image side in first lens group G1, it is possible to suppress a fluctuation of an image plane caused by magnification change and chromatic aberrations due to marginal rays. The negative meniscus lens having a concave object-side surface arranged on the most image side in first lens group G1 can ease a fluctuation of aberrations generated in first lens group G1.

In other words, when the most image side lens in first lens group G1 has a meniscus shape, it is possible to easily correct various aberrations generated in first lens group G1 in an excellent manner while the refractive power of the lens is set so as not to become too strong and a contribution of the refractive power of the lens to the refractive power of first lens group G1 is appropriately set. Further, when the negative meniscus lens on the most image side in first lens group G1 is a single lens having a concave object side surface, it is possible to reduce the size and to form an air lens between the negative meniscus lens and a lens (fourth lens L4 in the example of FIG. 1, Section A) immediately on the object side of the negative meniscus lens. Therefore, it is possible to correct a spherical aberration and chromatic aberrations in an excellent manner.

It is desirable that the following formula (1) is satisfied when a thickness of the negative meniscus lens on the most image side in first lens group G1 on an optical axis is d5, and a distance in air on the optical axis between the negative meniscus lens and a lens immediately on the object side of the negative meniscus lens is d45:

$$0.5 < d45/d5 < 3.0 \qquad (1).$$

The formula (1) is a relational expression of the ratio of a distance in air immediately on the object side of the negative meniscus lens on the most image side in first lens group G1 to the center thickness of the negative meniscus lens. When the value is lower than the lower limit of the formula (1), a distance in air between the negative meniscus lens on the most image side in first lens group G1 and a lens immediately on the object side of the negative meniscus lens becomes small, and it becomes necessary to increase the absolute value of the curvature radius of the object-side surface of the negative meniscus lens to secure a peripheral light amount on a wide angle side. Then, the effect of suppressing chromatic aberrations becomes weaker.

When the value exceeds the upper limit of the formula (1), the total thickness of first lens group G1 (a thickness on the optical axis from the most object side surface in first lens group G1 to the most image side surface in the first lens group G1) tends to become large. Therefore, the movement amount of the lens group during magnification change is restricted, and that is disadvantageous in reducing the size of the entire system and in increasing the magnification ratio. Further, a longitudinal chromatic aberration and a lateral chromatic aberration become unbalanced.

Therefore, it is more desirable that the following formula (1-1) is satisfied instead of the formula (1), and it is even more desirable that the following formula (1-2) is satisfied:

$$0.88 < d45/d5 < 1.82 \quad (1\text{-}1); \text{ and}$$

$$1.1 < d45/d5 < 1.4 \quad (1\text{-}2).$$

When the total thickness of first lens group G1 is LG1, it is desirable that the following formula (2) is satisfied with respect to the value of d45 and the total thickness LG1:

$$0.05 < d45/LG1 < 0.15 \quad (2).$$

The formula (2) is a relational expression of the ratio of a distance in air immediately on the object side of the negative meniscus lens on the most image side in first lens group G1 to the total thickness of first lens group G1. When the value is lower than the lower limit of the formula (2), the distance in air becomes short, and the effect of correcting aberrations becomes weak, or the total thickness of first lens group G1 becomes large, and that is disadvantageous in reducing the size. When the value exceeds the upper limit of the formula (2), the distance in air becomes long, and it becomes difficult to reduce the size and to increase the variable magnification ratio, or the total thickness of first lens group G1 becomes small, and restriction on the thickness, the shape or the like on the other lenses in first lens group G1 become severe, and a flexibility in correction of aberrations becomes lower.

Therefore, it is more desirable that the following formula (2-1) is satisfied instead of the formula (2), and it is even more desirable that the following formula (2-2) is satisfied:

$$0.05 < d45/LG1 < 0.1 \quad (2\text{-}1); \text{ and}$$

$$0.06 < d45/LG1 < 0.08 \quad (2\text{-}2).$$

Further, in the variable magnification optical system of the present embodiment, when a focal length of first lens group G1 is fG1, and a focal length of the negative meniscus lens on the most image side in first lens group G1 is f5, it is desirable that the following formula (3) is satisfied:

$$5.5 < f5/fG1 < 12.0 \quad (3).$$

The value of fG1, which is the focal length of first lens group G1, is related to the focal length of the entire lens system and the arrangement of the refractive power of first lens group G1 with the refractive power of second lens group G2. The formula (3) is a relational expression of the ratio of the refractive power of the negative meniscus lens on the most image side in first lens group G1 to the refractive power of the whole first lens group G1. The relational expression represents a contribution of this negative meniscus lens to first lens group G1.

When the value is lower than the lower limit of the formula (3), the contribution of the negative meniscus lens becomes too large, and the arrangement of refractive power in first lens group G1 becomes unbalanced. In a two-lens-group variable magnification optical system including a negative front lens group, such as the variable magnification optical system of the present embodiment, a negative lens or lenses are arranged on the object side in first lens group G1 to increase the angle of view of the entire system. For example, as illustrated in FIG. 1, Section A, negative first lens L1 and negative second lens L2 are arranged on the object side, and these two lenses have relatively strong negative refractive power to increase the angle of view of the entire system, and the refractive power of the two lenses dominates the negative refractive power of the whole first lens group G1. Here, if the refractive power of the negative meniscus lens on the most image side in first lens group G1 becomes stronger than necessary, the refractive power of negative lenses on the object side in first lens group G1 and the refractive power of the whole first lens group G1 change, and that influences the result of widening an angle of view and increasing a magnification ratio. Therefore, it becomes impossible to obtain a desirable angle of view and a desirable variable magnification ratio. In contrast, when the value exceeds the upper limit of the formula (3), the contribution of the negative meniscus lens on the most image side in first lens group G1 becomes too small, and the effect of correcting chromatic aberrations becomes weak.

Therefore, it is more desirable that the following formula (3-1) is satisfied instead of the formula (3), and it is even more desirable that the following formula (3-2) is satisfied:

$$5.5 < f5/fG1 < 9.3 \quad (3\text{-}1); \text{ and}$$

$$7.5 < f5/fG1 < 8.5 \quad (3\text{-}2).$$

Further, in the variable magnification optical system of the present embodiment, when first lens group G1 consists of five lenses of first lens L1, second lens L2, a cemented lens of negative third lens L3 and positive fourth lens L4 cemented together, and fifth lens L5 in this order from the object side, and the first lens L1 is a negative meniscus lens having a concave image-side surface, and the second lens L2 is a negative lens having a concave image-side surface, and the absolute value of the curvature radius of the image-side surface of the second lens L2 is less than the absolute value of the curvature radius of the object-side surface of the second lens L2, and the fifth lens L5 is a negative meniscus lens having a concave object-side surface, it is desirable that the following formula (4) is satisfied when the curvature radius of the object-side surface of second lens L2 is R3, and the curvature radius of the image-side surface of second lens L2 is R4:

$$0.8 < (R3-R4)/(R3+R4) < 1.5 \quad (4).$$

When the lower limit of the formula (4) is satisfied and (R3−R4)/(R3+R4)<1, second lens L2 is a meniscus lens, but when the lower limit of the formula (4) is satisfied and (R3−R4)/(R3+R4)>1, second lens L2 is a double-concave lens. As the value of (R3−R4)/(R3+R4) is greater, a distortion aberration in a large-angle region within the angle of view becomes larger, and the angle of view also becomes larger. At the same time, a contribution of second lens L2 to a fluctuation of an image plane in a large-angle region within the angle of view becomes larger. When the value is lower than the lower limit of the formula (4), it becomes difficult to correct the tendency that a tangential image plane at a wide-angle end tilts toward the image side and a spherical aberration at a telephoto end becomes large. When the value exceeds the upper limit of the formula (4), it becomes difficult to correct the tendency that especially a sagittal image plane at a wide-angle end sharply tilts toward the object side in a large-angle region within the angle of view.

Therefore, it is more desirable that the following formula (4-1) is satisfied instead of the formula (4)

$$0.9 < (R3-R4)/(R3+R4) < 1.2 \quad (4\text{-}1).$$

Further, in the variable magnification optical system of the present embodiment, it is desirable that second lens group G2 consists of positive sixth lens L6, negative seventh lens L7, positive eighth lens L8, and a cemented lens composed of negative ninth lens L9 and positive tenth lens L10 cemented together, which are in this order from the object side. Further, it is desirable that all of the three positive lenses (sixth lens L6, eighth lens L8 and tenth lens L10) in second lens group G2 are double-convex lenses, and at least two of the three positive lenses satisfy the following formulas (5) and (6):

$$80.0 < vd \quad (5); \text{ and}$$

$$0.530 < \theta gF \quad (6).$$

Here, vd represents an Abbe number for d-line. Further, θgF is a partial dispersion ratio for g-line and F-line, which is defined as θgF=(Ng−NF)/(NF−NC) when Ng, Nd, NF and NC represent refractive indices for g-line, d-line, F-line and C-line, respectively.

The formula (5) and the formula (6) are related to the double-convex lenses in second lens group G2. When at least two of the three positive lenses in second lens group G2 satisfy the formulas (5) and (6), it is possible to make the at least two of the double-convex lenses in second lens group G2 made of an anomalous dispersion material (hereinafter, referred to as anomalous dispersion lens). The anomalous dispersion lens is necessary to reduce a secondary spectrum of chromatic aberrations. It is effective to use at least two anomalous dispersion lenses to correct chromatic aberrations for a wide wavelength range including a visible wavelength band through a near-infrared wavelength band.

When second lens group G2 consists of five lenses of sixth lens L6 through tenth lens L10, as described above, and the formulas (5) and (6) are satisfied, first group G1 may adopt a different mode from the structure illustrated in FIG. 1. The different mode is, for example, a mode that will be described in examples later. First lens group may consist of five lenses of first lens that is a negative meniscus lens having a concave image-side surface, second lens that is a negative meniscus lens having a concave image-side surface, third lens that is a negative meniscus lens having a concave image-side surface, double-concave-shaped fourth lens, and fifth lens that is a positive meniscus lens having a concave image-side surface, which are in this order from the object side.

In the different mode, as described above, three negative meniscus lenses having concave image-side surfaces are consecutively arranged on the object side in first lens group, and that is advantageous to widen an angle of view. Further, since the meniscus-shaped fifth lens having a convex object-side surface is arranged immediately on the image side of the fourth lens that is a double-concave lens, it is possible to excellently correct a spherical aberration while reducing the size. Further, when second lens group G2 consists of the five lenses of sixth lens L6 through tenth lens L10, as described above, and the formulas (5) and (6) are satisfied, the first lens group may consist of only single lenses, which are not cemented. In such a case, the structure is cost-advantageous.

When second lens group G2 includes five lenses of sixth lens L6 through tenth lens L10, as described above, it is desirable that the following formulas (7) through (9) are satisfied when vd7 and f7 are an Abbe number of seventh lens L7 for d-line and a focal length of seventh lens L7, respectively, and vd9 and f9 are an Abbe number of ninth lens L9 for d-line and a focal length of ninth lens L9, respectively:

$$60.0 < vd7 + vd9 < 85.0 \quad (7);$$

$$vd7 > vd9 \quad (8); \text{ and}$$

$$2.0 < f7/f9 < 4.5 \quad (9).$$

It is necessary to appropriately select the properties of a negative lens that is paired with a positive lens for achromatization in addition to use of an anomalous dispersion material as the material of the positive lens to reduce chromatic aberrations in a wide wavelength range including a visible wavelength band through a near-infrared wavelength band. The formulas (7) and (8) are related to the Abbe numbers of the two negative lenses (seventh lens L7 and ninth lens L9) in second lens group G2. The formula (9) is related to a focal length of each negative lens that is a single lens.

The two negative lenses in second lens group G2 suppress chromatic aberrations in combination with the at least two anomalous dispersion lenses in second lens group G2. When the value is lower than the lower limit of the formula (7), it becomes difficult to suppress a secondary spectrum. When the value exceeds the upper limit of the formula (7), correction is insufficient with respect to primary achromatization.

The formulas (8) and (9) represent the feature that the roles of the two negative lenses in second lens group G2 in reduction of chromatic aberrations differ from each other. At seventh lens L7, which is a negative lens located more on the object side in second lens group G2, the diameter of rays especially at a wide-angle end is large. If the dispersion of this lens is high, a short-wavelength-side aberration at a marginal ray becomes large. When the refractive power of ninth lens L9 is higher than the refractive power of seventh lens L7 in second lens group G2, and a higher dispersion material is used in ninth lens L9, it is possible to excellently correct chromatic aberrations. When the value is lower than the lower limit of the formula (9), astigmatism at a telephoto end increases, and required performance is not satisfied. When the value exceeds the upper limit of the formula (9), it becomes difficult to correct a longitudinal chromatic aberration in a range including a near-infrared wavelength band especially at a wide-angle end.

Therefore, it is more desirable that the following formula (7-1) is satisfied instead of the formula (7)

$$65.0 < vd7 + vd9 < 80.0 \quad (7\text{-}1).$$

Therefore, it is more desirable that the following formula (9-1) is satisfied instead of the formula (9)

$$2.0 < f7/f9 < 3.6 \quad (9\text{-}1).$$

Further, in the variable magnification optical system of the present embodiment, it is desirable that a most object side lens in second lens group G2 is an aspherical lens, and all of the other lenses in the entire system are spherical lenses. When the aspherical lens is arranged on the most object side in second lens group G2, it is possible to easily suppress a fluctuation of aberrations during magnification change. Further, since the aspherical lens is arranged at this position, it is possible to effectively correct aberrations in an excellent manner while the optical system is structured at low cost by suppressing the number of the aspherical lens or lenses. For example, it is possible to satisfy desirable specification and performance by using only one aspherical lens, which is this aspherical lens, in the entire system.

Further, in the variable magnification optical system of the present embodiment, it is desirable that a variable magnification ratio from a wide-angle end to a telephoto end is greater than or equal to 2.6 times. Accordingly, high variable magnification is achievable to satisfy a level requested in recent years in the application fields of the variable magnification optical system of the present embodiment.

Specifically, the variable magnification optical system of the present embodiment is appropriate to realize, for example, a lens system with a full angle of about 145° through 165° at a wide-angle end and a variable magnification ratio of about 2.7 times.

Here, when the variable magnification optical system of the present embodiment is used in tough conditions, for example, such as outdoors, it is desirable that the lens arranged on the most object side uses a material resistant to a deterioration of a surface by wind and rain and a change in temperature by direct sun light, and also resistant to chemicals, such as oils and fats and detergents. In other words, it is desirable to use a material that is highly water-resistant, weather-resistant, acid-resistant, chemical-resistant, and the like. Further, it is desirable to use a material that is hard and not easily breakable. When it is important to satisfy these requirements, it is desirable that the material of the lens arranged on the most object side is glass. Alternatively, transparent ceramic may be used.

When the variable magnification optical system of the present embodiment is used in tough conditions, it is desirable that a multi-layer coating for protection is applied. Besides the coating for protection, an anti-reflection coating for reducing ghost light or the like during usage may be applied.

In the example illustrated in FIG. 1, Sections A and B, optical member PP is arranged further on the image side of the most-image-side lens. Alternatively, various filters may be arranged between lenses. Alternatively, a coating having similar action to that of various filters may be applied to a lens surface of one of the lenses.

Figure 3:
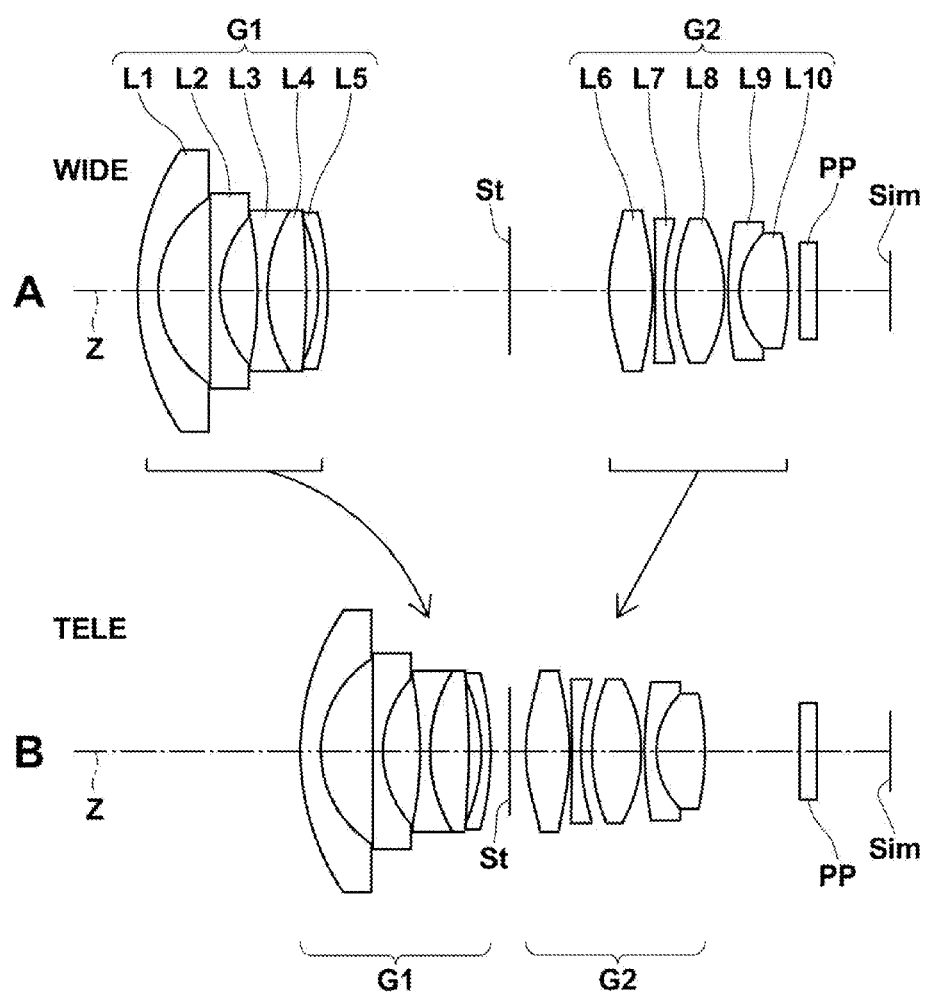
FIG. 3, Sections A and B are cross sections illustrating the lens structure of a variable magnification optical system in Example 2 of the present invention at a wide-angle end and at telephoto end, respectively.
Figure 5:
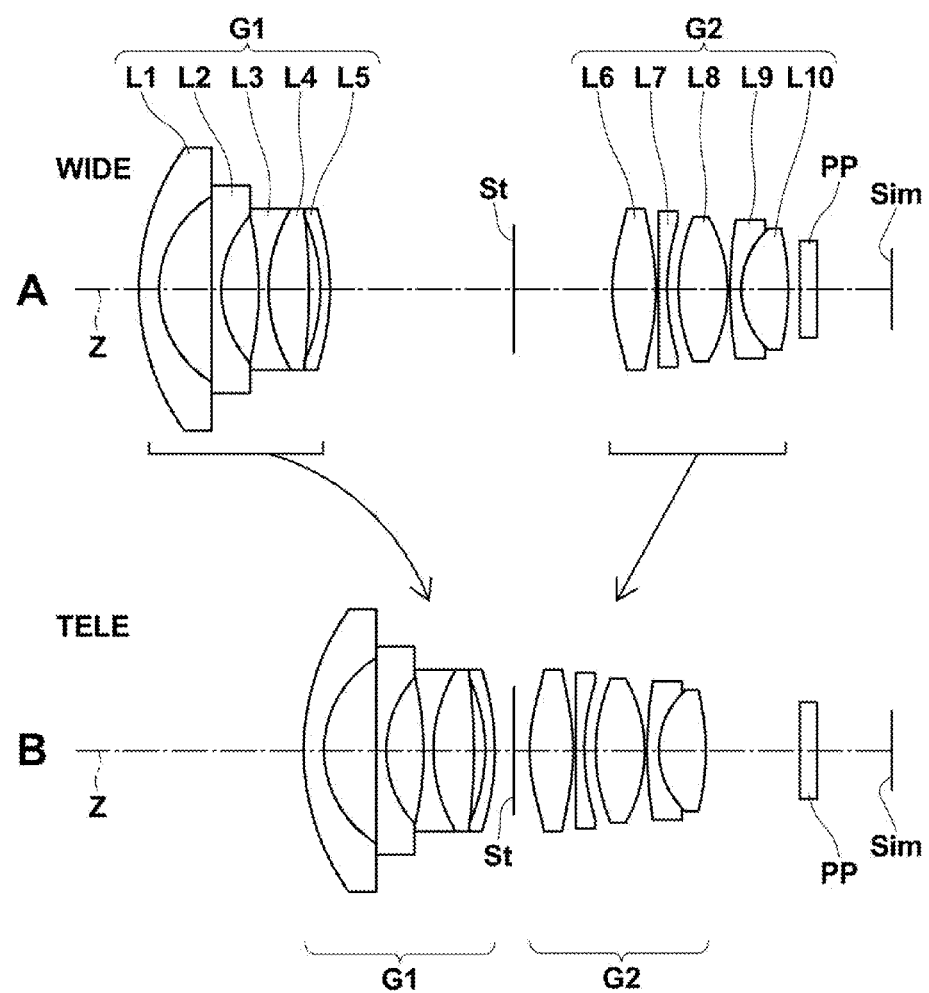
FIG. 5, Sections A and B are cross sections illustrating the lens structure of a variable magnification optical system in Example 3 of the present invention at a wide-angle end and at telephoto end, respectively.
Figure 7:
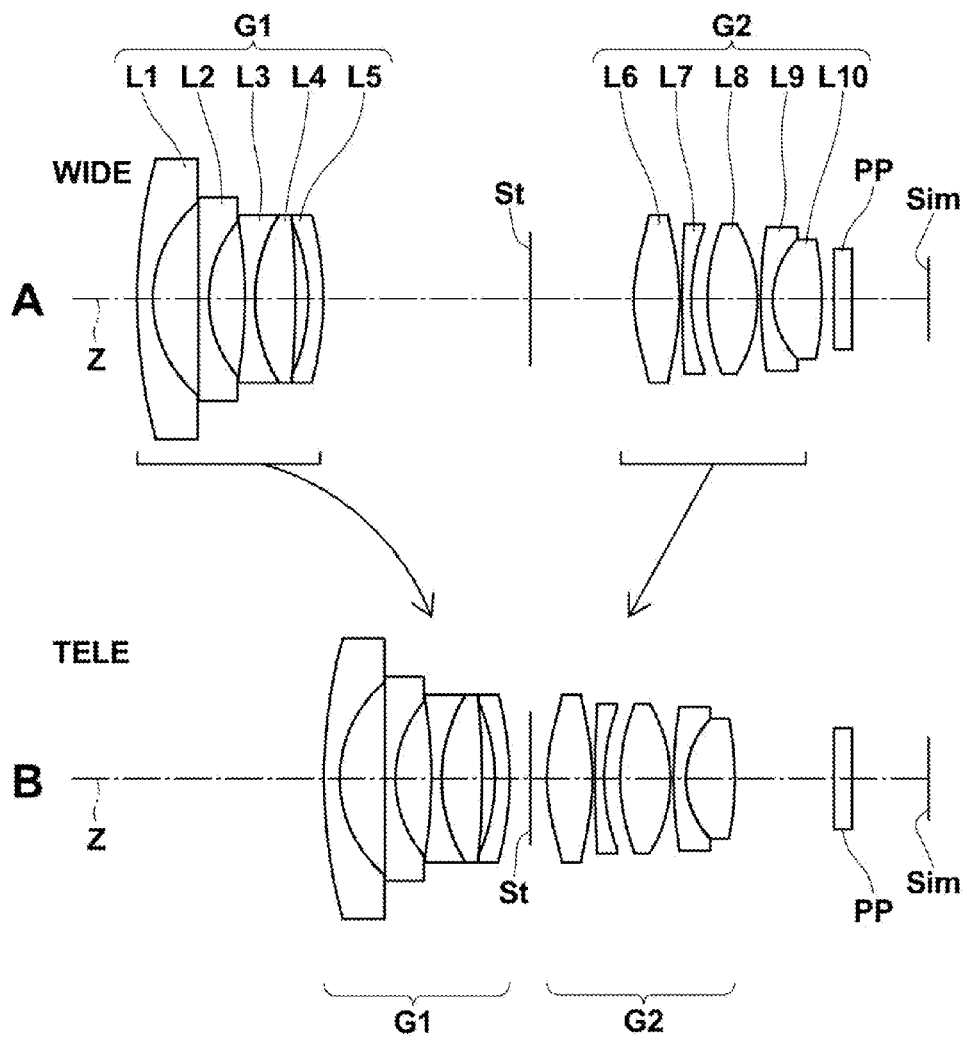
FIG. 7, Sections A and B are cross sections illustrating the lens structure of a variable magnification optical system in Example 4 of the present invention at a wide-angle end and at telephoto end, respectively.
Figure 9:
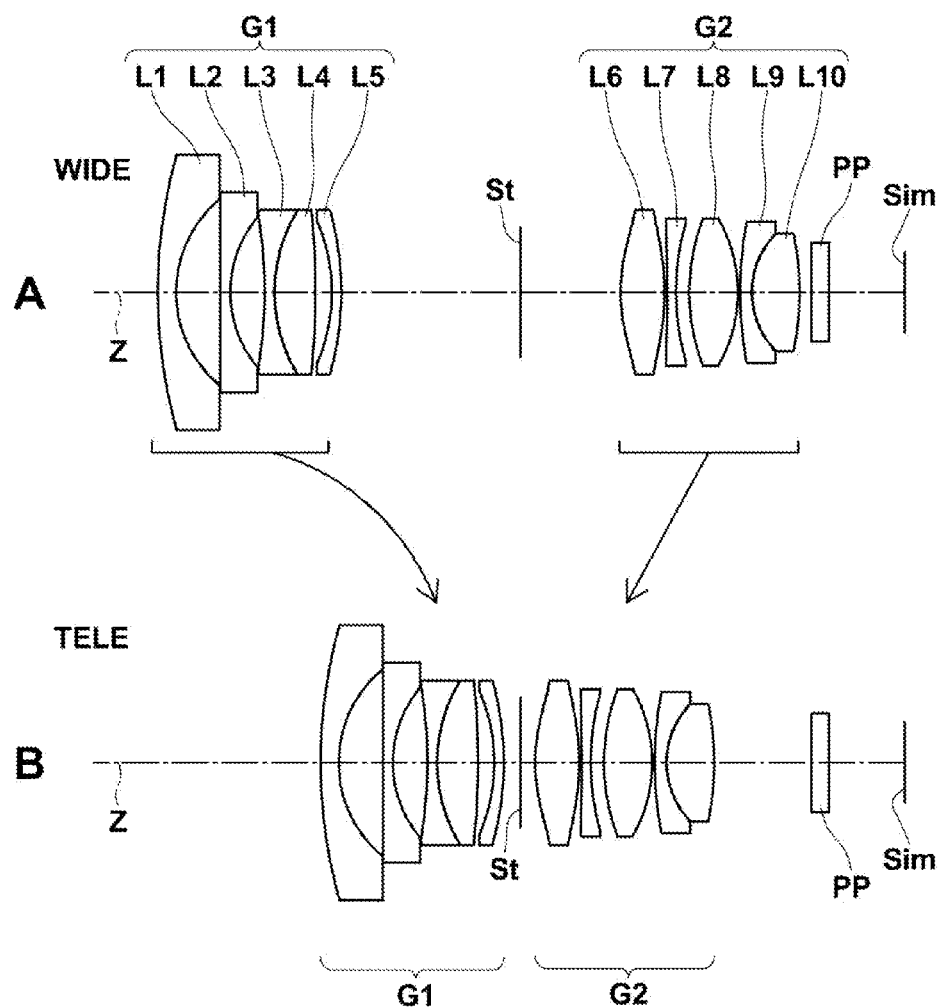
FIG. 9, Sections A and B are cross sections illustrating the lens structure of a variable magnification optical system in Example 5 of the present invention at a wide-angle end and at telephoto end, respectively.
Figure 11:
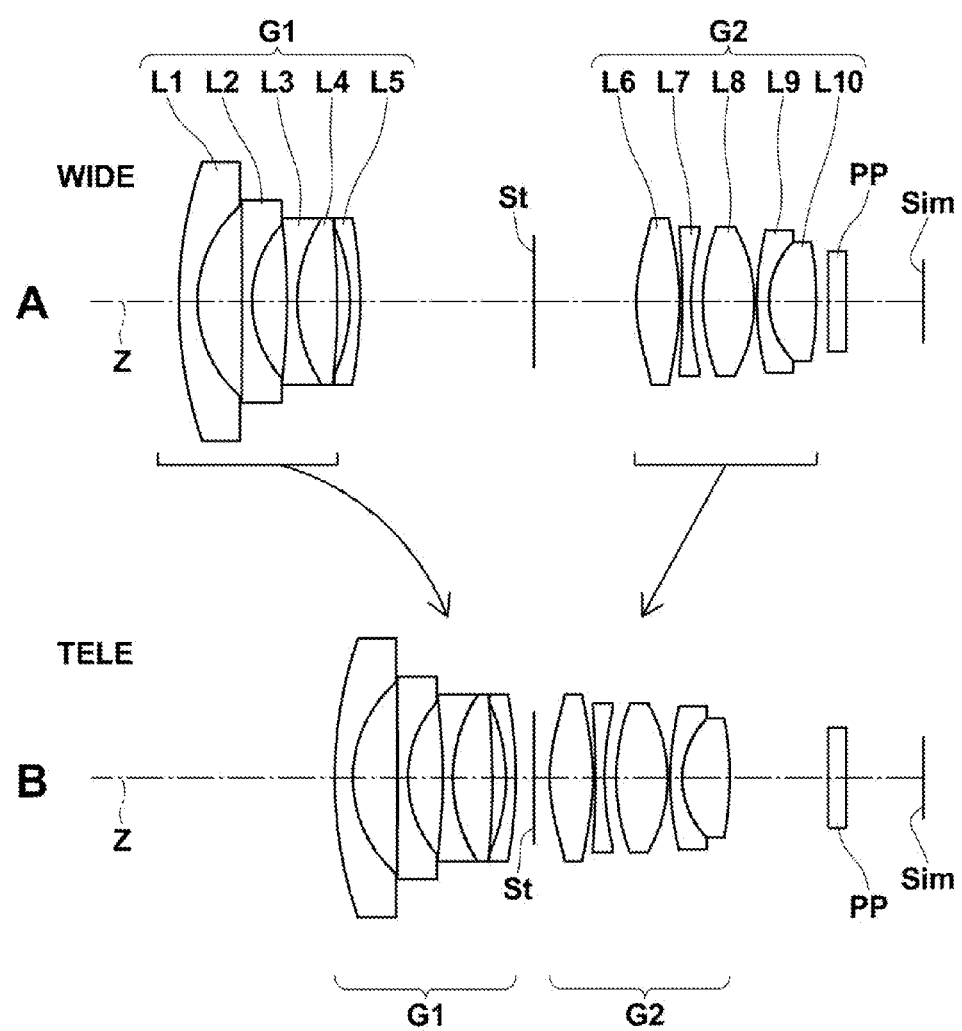
FIG. 11, Sections A and B are cross sections illustrating the lens structure of a variable magnification optical system in Example 6 of the present invention at a wide-angle end and at telephoto end, respectively.
Figure 13:
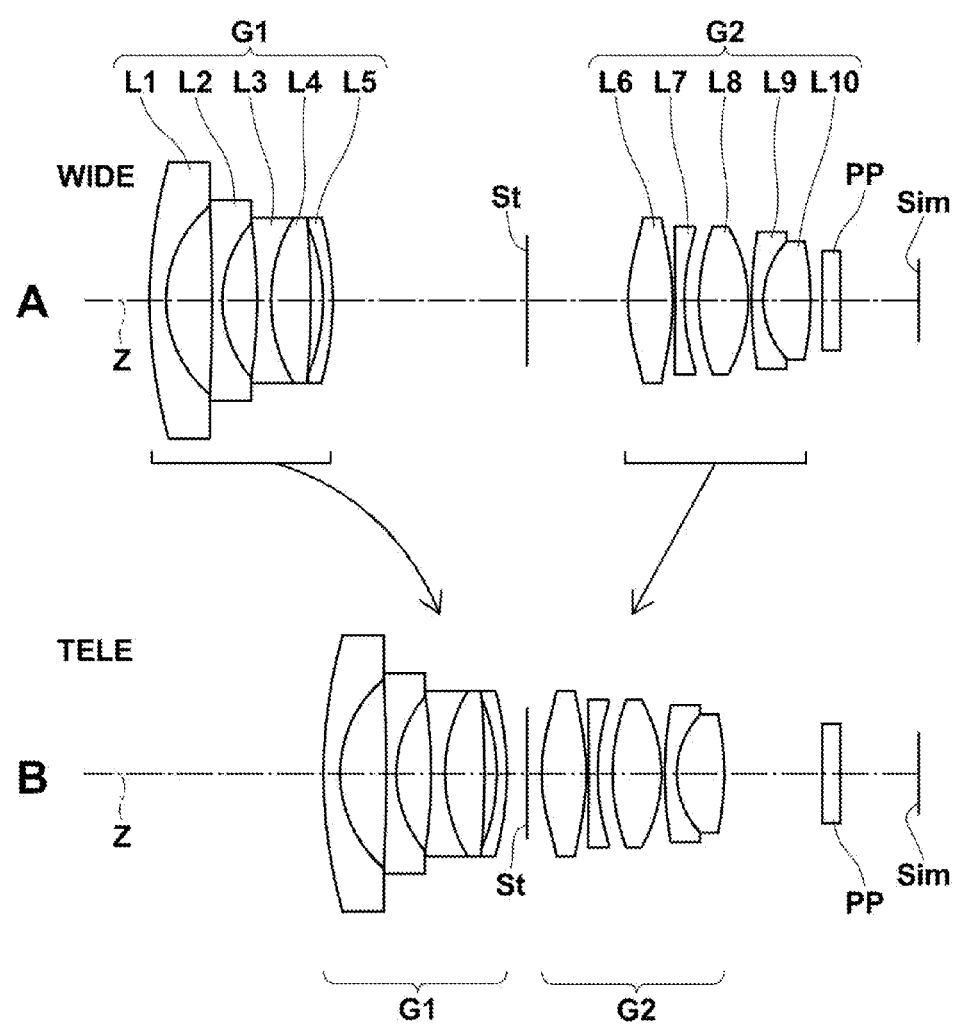
FIG. 13, Sections A and B are cross sections illustrating the lens structure of a variable magnification optical system in Example 7 of the present invention at a wide-angle end and at telephoto end, respectively.
Figure 15:
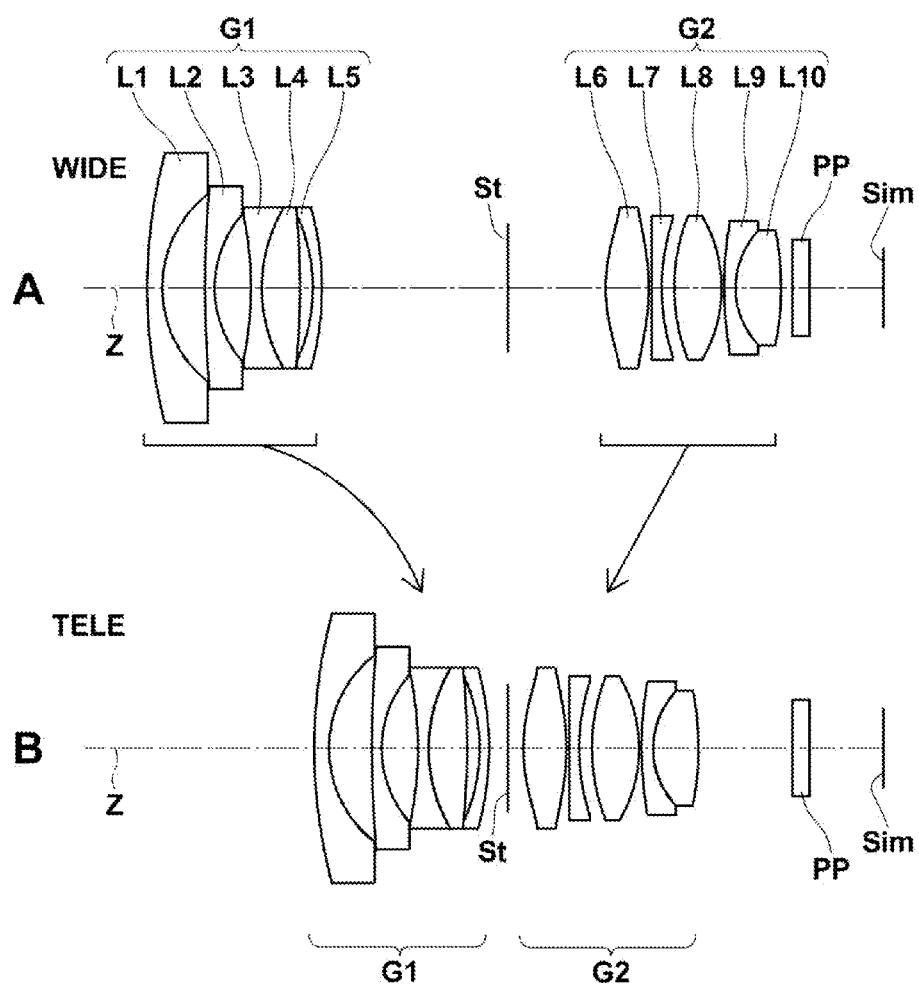
FIG. 15, Sections A and B are cross sections illustrating the lens structure of a variable magnification optical system in Example 8 of the present invention at a wide-angle end and at telephoto end, respectively.
Figure 17:
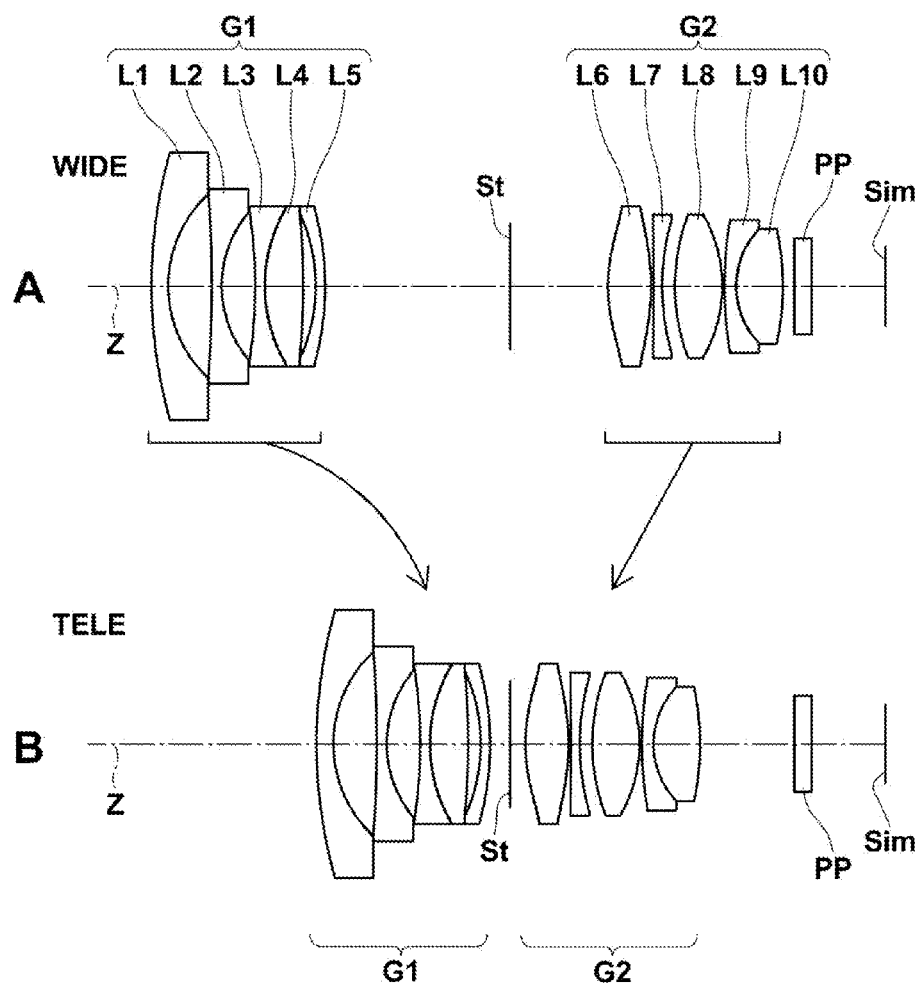
FIG. 17, Sections A and B are cross sections illustrating the lens structure of a variable magnification optical system in Example 9 of the present invention at a wide-angle end and at telephoto end, respectively.
Figure 19:
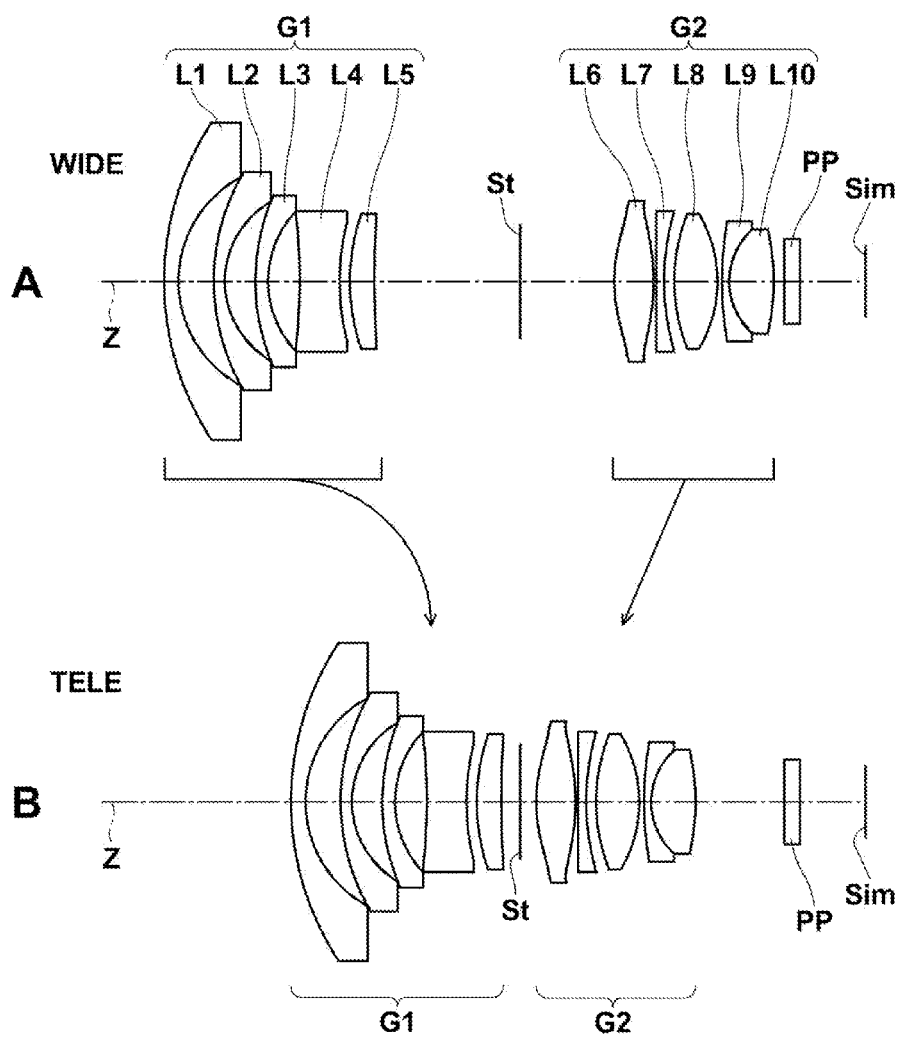
FIG. 19, Sections A and B are cross sections illustrating the lens structure of a variable magnification optical system in Example 10 of the present invention at a wide-angle end and at telephoto end, respectively.
Figure 21:
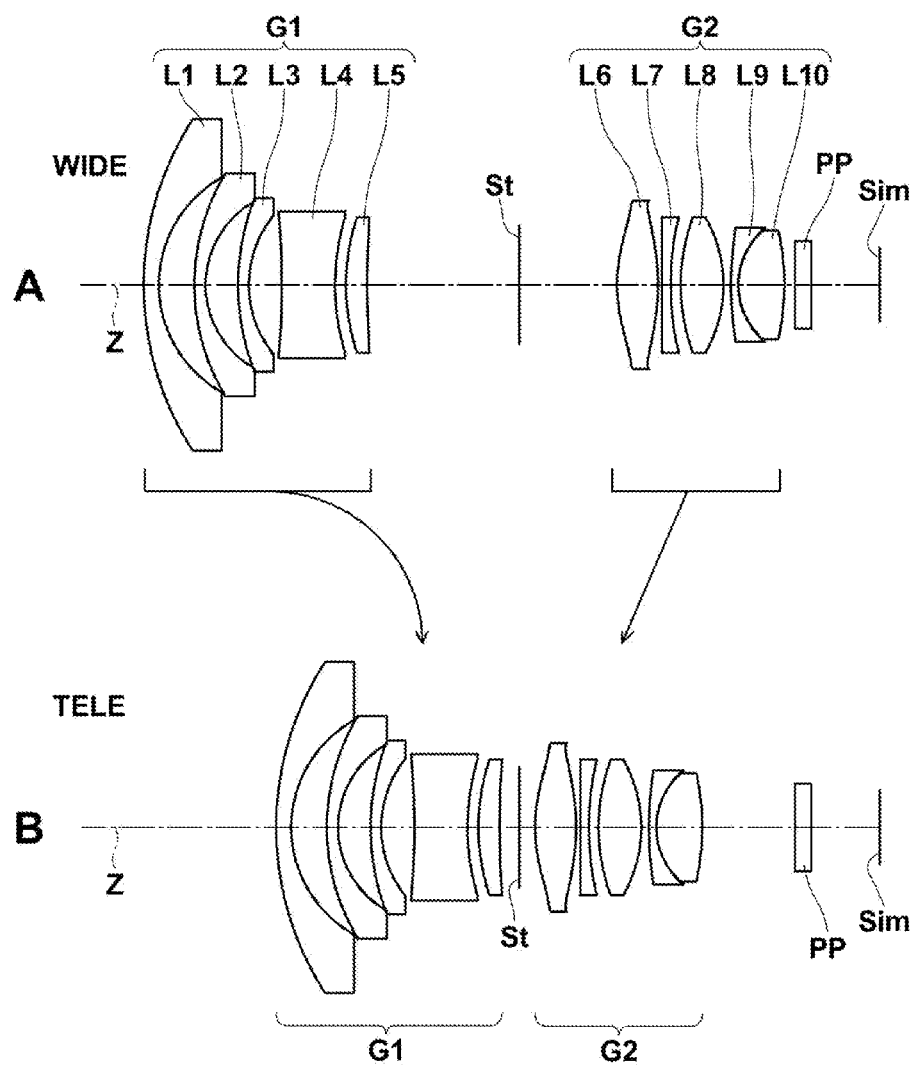
FIG. 21, Sections A and B are cross sections illustrating the lens structure of a variable magnification optical system in Example 11 of the present invention at a wide-angle end and at telephoto end, respectively.
Figure 23:
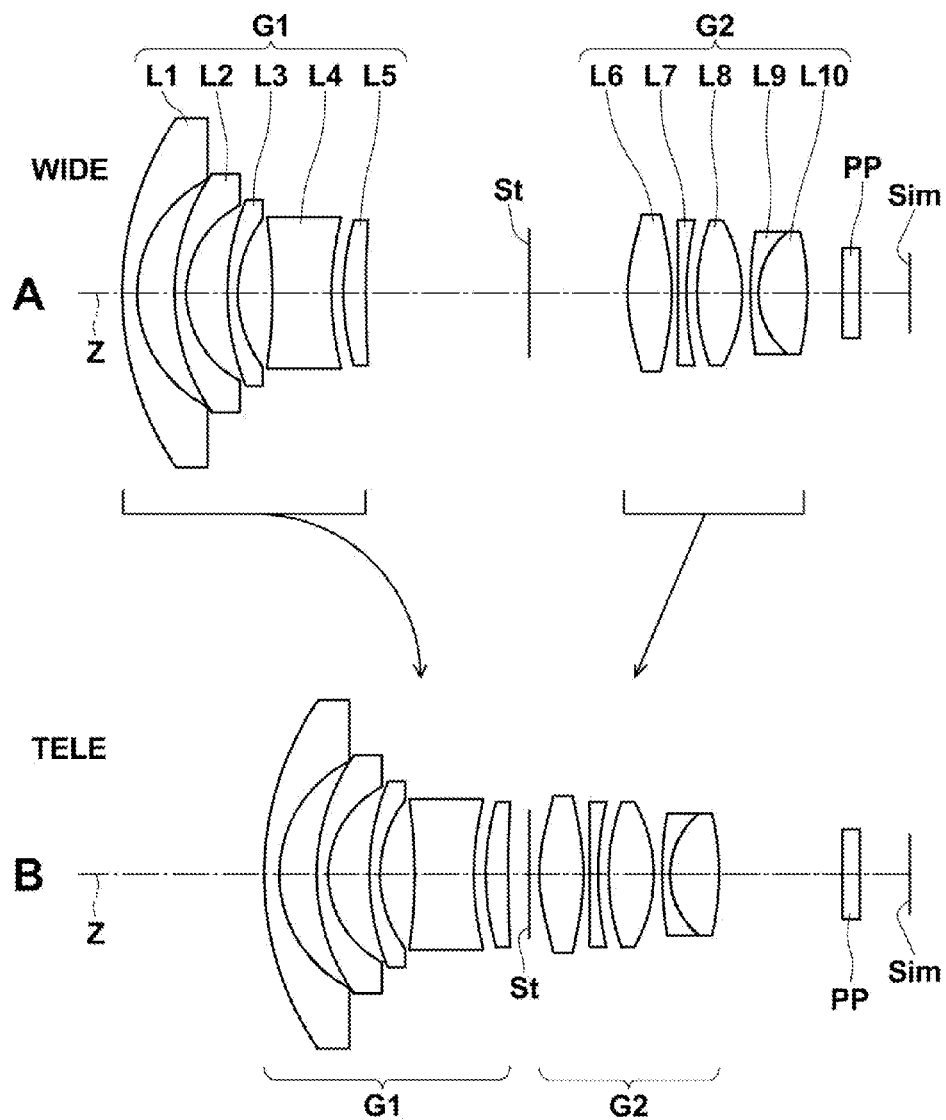
FIG. 23, Sections A and B are cross sections illustrating the lens structure of a variable magnification optical system in Example 12 of the present invention at a wide-angle end and at telephoto end, respectively.

Next, numerical value examples of the variable magnification optical system of the present invention will be described. FIG. 1, Sections A and B illustrate lens cross sections of the variable magnification optical system in Example 1. FIG. 3, Sections A and B, FIG. 5, Sections A and B, FIG. 7, Sections A and B, FIG. 9, Sections A and B, FIG. 11, Sections A and B, FIG. 13, Sections A and B, FIG. 15, Sections A and B, FIG. 17, Sections A and B, FIG. 19, Sections A and B, FIG. 21, Sections A and B, and FIG. 23, Sections A and B illustrate lens cross sections of the variable magnification optical systems in Examples 2 through 12, respectively. The method of illustration of these lens cross sections of Examples 2 through 12 is basically similar to the method of illustration of the lens cross sections of Example 1, as described above.

Table 1 shows basic lens data on a variable magnification optical system in Example 1, and Table 2 shows aspheric coefficients. Similarly, Table 3 through Table 24 show basic lens data and aspheric coefficients on the variable magnification optical systems in Examples 2 through 12. Next, the meanings of signs in the tables will be described, using the tables of Example 1 as an example. The meaning of signs in the tables of Examples 2 through 12 are basically similar unless otherwise noted. Therefore, descriptions about the tables of basic lens data and the tables of aspheric coefficients for Examples 2 through 12 are omitted to avoid repetition.

In a table in the upper section of Table 1, the column of Si shows the surface numbers of i-th (i=1, 2, 3, . . . ) surfaces. The surface number of the object-side surface of the most-object-side element is the first surface, and the surface numbers sequentially increase toward the image side. The column of Ri shows the curvature radius of the i-th surface. The column of Di shows a distance, on optical axis Z, between the i-th surface and the (i+1)th surface. The column of Ndj shows the refractive index of a j-th (j=1, 2, 3, . . . ) optical element for d-line (wavelength is 587.6 nm) when the most-object-side optical element is the first optical element, and the value of j sequentially increases toward the image side. Further the column of vdj shows the Abbe number of the j-th optical element for d-line, and the column of θgFj shows a partial dispersion ratio of g-line and F-line of the j-th optical element.

The sign of a curvature radius is positive when the shape of a surface is convex toward the object side, and negative when the shape of a surface is convex toward the image side. Further, the table in the upper section of table 1 includes aperture stop St, optical member PP and an image plane. The sign "∞ (APERTURE STOP)" is written for a surface corresponding to aperture stop St in the column of curvature radius. Further, the term "IMAGE PLANE" is written for a surface corresponding to image plane Sim in the column of surface number.

In the table in the upper section of Table 1, "VARIABLE D9", "VARIABLE D10", and "VARIABLE D19" are written in the rows of surface distances that change when magnification is changed. The variable D9 is a distance between first lens group G1 and aperture stop St, and the variable D10 is a distance between aperture stop St and second lens group G2, and the variable D19 is a distance between second lens group G2 and optical member PP. In Examples 10 through 12, variable D10, variable D11 and variable D20 are used instead of the variable D9, the variable D10 and the variable D19.

A table in the lower section of table 1 shows, as data about variable magnification, the focal length of the entire system, F-number (Fno.), full angle of view 2ω, variable D9, variable D10, and variable D19 at a wide-angle end and at a telephoto end. In table 1, degree is used as the unit of angle, and mm is used as the unit of length. However, since an optical system can be used by proportionally enlarging or reducing the optical system, other appropriate units may be used. Further, in each of the tables in the specification of the present application, values are rounded to predetermined digits.

In the table in the upper section of table 1, mark * is attached to the surface number of an aspherical surface. Table 1 shows, as the curvature radius of the aspherical surface, the numerical value of a paraxial curvature radius. Table 2 shows aspheric coefficients about the aspherical surfaces. In the numerical values of the aspheric coefficients in Table 2, "E-n" (n: integer) means and "E+n" means "x10$^n$". The aspheric coefficients are coefficients K, Am=3, 4, 5, . . . 20) in the following aspherical equation:

$$Zd = \frac{C \times Y^2}{1 + \sqrt{1 - K \times C^2 \times Y^2}} + \sum_m A_m Y^m, \quad \text{[Formula 1]}$$

where

Zd: depth of aspherical surface (the length of a perpendicular from a point on the aspherical surface at height Y to a flat plane that contacts with the vertex of the aspherical surface and is perpendicular to the optical axis), Y: height (the length from the optical axis to the lens surface), C: paraxial curvature, and K, Am: aspheric coefficients (m=3, 4, 5, . . . 20).

TABLE 1

EXAMPLE 1

| Si | Ri | Di | Ndj | νdj | θgFj |
|---|---|---|---|---|---|
| 1 | 44.2364 | 1.32 | 1.69895 | 30.13 | 0.6030 |
| 2 | 10.3760 | 3.75 | | | |
| 3 | ∞ | 0.86 | 1.80000 | 29.84 | 0.6017 |
| 4 | 9.9033 | 2.96 | | | |
| 5 | −39.3417 | 0.89 | 1.51742 | 52.43 | 0.5564 |
| 6 | 13.3670 | 3.44 | 1.92286 | 20.88 | 0.6388 |
| 7 | −69.9109 | 1.11 | | | |
| 8 | −15.1676 | 0.81 | 1.56883 | 56.36 | 0.5489 |
| 9 | −25.8550 | VARIABLE D9 | | | |
| 10 | ∞ (APERTURE STOP) | VARIABLE D10 | | | |
| 11* | 14.3963 | 3.78 | 1.56868 | 58.27 | 0.5536 |
| 12* | −18.7999 | 0.22 | | | |
| 13 | −1262.9268 | 0.76 | 1.56732 | 42.82 | 0.5731 |
| 14 | 20.0662 | 1.17 | | | |
| 15 | 17.2665 | 4.16 | 1.49700 | 81.54 | 0.5375 |
| 16 | −12.4325 | 0.21 | | | |
| 17 | 34.2619 | 0.98 | 1.90366 | 31.32 | 0.5948 |
| 18 | 7.1980 | 3.99 | 1.49700 | 81.54 | 0.5375 |
| 19 | −24.2428 | VARIABLE D19 | | | |
| 20 | ∞ | 1.50 | 1.51633 | 64.14 | 0.5353 |
| 21 | ∞ | 6.50 | | | |
| IMAGE PLANE | ∞ | | | | |

| | FOCAL LENGTH | Fno. | 2ω | VARIABLE D9 | VARIABLE D10 | VARIABLE D19 |
|---|---|---|---|---|---|---|
| WIDE-ANGLE END | 2.89 | 1.34 | 158.7 | 16.28 | 8.58 | 1.00 |
| TELEPHOTO END | 7.82 | 2.15 | 50.0 | 1.66 | 1.38 | 8.20 |

TABLE 2

EXAMPLE 1

| Si | K | A3 | A4 | A5 | A6 |
|---|---|---|---|---|---|
| 11 | 0.0000000E+00 | 2.4731528E−05 | −1.4767865E−04 | 1.2847457E−05 | −2.0140639E−06 |
| 12 | 0.0000000E+00 | 1.8590957E−05 | 1.5466911E−04 | 2.4768486E−06 | 9.8925372E−07 |

| Si | A7 | A8 | A9 | A10 | A11 |
|---|---|---|---|---|---|
| 11 | −1.5435412E−07 | −3.2362239E−09 | 2.2106502E−09 | −1.2205481E−10 | −6.3333639E−14 |
| 12 | −6.5535922E−07 | 6.5461995E−08 | −1.7615358E−09 | 4.9113926E−11 | 2.4295615E−13 |

| Si | A12 | A13 | A14 | A15 | A16 |
|---|---|---|---|---|---|
| 11 | −7.0882731E−13 | −1.1822955E−14 | −8.3289647E−15 | −3.7639460E−15 | −1.1749231E−15 |
| 12 | −5.6507494E−14 | −9.7015623E−15 | −2.2335941E−16 | −2.5893401E−17 | −5.7284309E−16 |

| Si | A17 | A18 | A19 | A20 | |
|---|---|---|---|---|---|
| 11 | −5.8619725E−17 | 2.1869925E−17 | 1.8951588E−18 | 3.0181727E−19 | |
| 12 | −3.0889926E−16 | 5.1694973E−17 | 2.2423508E−18 | 1.0525292E−19 | |

TABLE 3

EXAMPLE 2

| Si | Ri | Di | Ndj | νdj | θgFj |
|---|---|---|---|---|---|
| 1 | 22.0681 | 1.75 | 1.85026 | 32.27 | 0.5929 |
| 2 | 9.5622 | 4.51 | | | |
| 3 | ∞ | 0.86 | 1.80000 | 29.84 | 0.6017 |
| 4 | 9.4728 | 3.24 | | | |
| 5 | −31.6826 | 0.84 | 1.51742 | 52.43 | 0.5564 |

TABLE 3-continued

EXAMPLE 2

| | | | | | |
|---|---|---|---|---|---|
| 6 | 13.5124 | 3.35 | 1.92286 | 20.88 | 0.6388 |
| 7 | −69.9982 | 1.07 | | | |
| 8 | −15.2000 | 0.82 | 1.57135 | 52.95 | 0.5553 |
| 9 | −25.7000 | VARIABLE D9 | | | |
| 10 | ∞ (APERTURE STOP) | VARIABLE D10 | | | |
| 11* | 14.3963 | 3.78 | 1.56868 | 58.27 | 0.5536 |
| 12* | −18.7999 | 0.21 | | | |
| 13 | −201.1656 | 0.76 | 1.56732 | 42.82 | 0.5731 |
| 14 | 19.9569 | 0.96 | | | |
| 15 | 16.2384 | 4.25 | 1.49700 | 81.54 | 0.5375 |
| 16 | −12.5808 | 0.30 | | | |
| 17 | 31.3223 | 1.00 | 1.90366 | 31.32 | 0.5947 |
| 18 | 7.1000 | 4.22 | 1.49700 | 81.54 | 0.5375 |
| 19 | −23.1510 | VARIABLE D19 | | | |
| 20 | ∞ | 1.50 | 1.51633 | 64.14 | 0.5353 |
| 21 | ∞ | 6.32 | | | |
| IMAGE PLANE | ∞ | | | | |

| | FOCAL LENGTH | Fno. | 2ω | VARIABLE D9 | VARIABLE D10 | VARIABLE D19 |
|---|---|---|---|---|---|---|
| WIDE-ANGLE END | 2.81 | 1.32 | 147.2 | 15.67 | 8.56 | 1.00 |
| TELEPHOTO END | 7.58 | 2.14 | 51.2 | 1.61 | 1.33 | 8.23 |

TABLE 4

EXAMPLE 2

| Si | K | A3 | A4 | A5 | A6 |
|---|---|---|---|---|---|
| 11 | 0.0000000E+00 | 2.4731528E−05 | −1.4767865E−04 | 1.2847457E−05 | −2.0140639E−06 |
| 12 | 0.0000000E+00 | 1.8590957E−05 | 1.5466911E−04 | 2.4768486E−06 | 9.8925372E−07 |

| Si | A7 | A8 | A9 | A10 | A11 |
|---|---|---|---|---|---|
| 11 | −1.5435412E−07 | −3.2362239E−09 | 2.2106502E−09 | −1.2205481E−10 | −6.3333639E−14 |
| 12 | −6.5535922E−07 | 6.5461995E−08 | −1.7615358E−09 | 4.9113926E−11 | 2.4295615E−13 |

| Si | A12 | A13 | A14 | A15 | A16 |
|---|---|---|---|---|---|
| 11 | −7.0882731E−13 | −1.1822955E−14 | −8.3289647E−15 | −3.7639460E−15 | −1.1749231E−15 |
| 12 | −5.6507494E−14 | −9.7015623E−15 | −2.2335941E−16 | −2.5893401E−17 | −5.7284309E−16 |

| Si | A17 | A18 | A19 | A20 | |
|---|---|---|---|---|---|
| 11 | −5.8619725E−17 | 2.1869925E−17 | 1.8951588E−18 | 3.0181727E−19 | |
| 12 | −3.0889926E−16 | 5.1694973E−17 | 2.2423508E−18 | 1.0525292E−19 | |

TABLE 5

EXAMPLE 3

| Si | Ri | Di | Ndj | vdj | θgFj |
|---|---|---|---|---|---|
| 1 | 20.9935 | 1.75 | 1.85026 | 32.27 | 0.5929 |
| 2 | 9.3800 | 4.55 | | | |
| 3 | ∞ | 0.86 | 1.80000 | 29.84 | 0.6017 |
| 4 | 9.3955 | 3.26 | | | |
| 5 | −27.6869 | 0.84 | 1.53172 | 48.84 | 0.5631 |
| 6 | 13.4334 | 3.51 | 1.92286 | 20.88 | 0.6388 |
| 7 | −54.9989 | 1.01 | | | |
| 8 | −15.0442 | 0.82 | 1.72000 | 43.69 | 0.5699 |
| 9 | −22.4000 | VARIABLE D9 | | | |
| 10 | ∞ (APERTURE STOP) | VARIABLE D10 | | | |

TABLE 5-continued

EXAMPLE 3

|  | Ri | Di | Ndj | vdj | θgFj |
|---|---|---|---|---|---|
| 11* | 14.3963 | 3.78 | 1.56868 | 58.27 | 0.5536 |
| 12* | −18.7999 | 0.22 | | | |
| 13 | 8491.7411 | 0.76 | 1.58267 | 46.42 | 0.5671 |
| 14 | 19.2304 | 0.98 | | | |
| 15 | 15.8408 | 4.27 | 1.49700 | 81.54 | 0.5375 |
| 16 | −12.6169 | 0.20 | | | |
| 17 | 36.3588 | 1.00 | 1.90366 | 31.32 | 0.5947 |
| 18 | 7.1000 | 4.10 | 1.49700 | 81.54 | 0.5375 |
| 19 | −21.5832 | VARIABLE D19 | | | |
| 20 | ∞ | 1.50 | | | 0.5353 |
| 21 | ∞ | 6.48 | | | |
| IMAGE PLANE | ∞ | | | | |

| | FOCAL LENGTH | Fno. | 2ω | VARIABLE D9 | VARIABLE D10 | VARIABLE D19 |
|---|---|---|---|---|---|---|
| WIDE-ANGLE END | 2.81 | 1.33 | 145.6 | 15.95 | 8.56 | 1.00 |
| TELEPHOTO END | 7.59 | 2.14 | 51.0 | 1.62 | 1.32 | 8.24 |

TABLE 6

EXAMPLE 3

| Si | K | A3 | A4 | A5 | A6 |
|---|---|---|---|---|---|
| 11 | 0.0000000E+00 | 2.4731528E−05 | −1.4767865E−04 | 1.2847457E−05 | −2.0140639E−06 |
| 12 | 0.0000000E+00 | 1.8590957E−05 | 1.5466911E−04 | 2.4768486E−06 | 9.8925372E−07 |

| Si | A7 | A8 | A9 | A10 | A11 |
|---|---|---|---|---|---|
| 11 | −1.5435412E−07 | −3.2362239E−09 | 2.2106502E−09 | −1.2205481E−10 | −6.3333639E−14 |
| 12 | −6.5535922E−07 | 6.5461995E−08 | −1.7615358E−09 | 4.9113926E−11 | 2.4295615E−13 |

| Si | A12 | A13 | A14 | A15 | A16 |
|---|---|---|---|---|---|
| 11 | −7.0882731E−13 | −1.1822955E−14 | −8.3289647E−15 | −3.7639460E−15 | −1.1749231E−15 |
| 12 | −5.6507494E−14 | −9.7015623E−15 | −2.2335941E−16 | −2.5893401E−17 | −5.7284309E−16 |

| Si | A17 | A18 | A19 | A20 | |
|---|---|---|---|---|---|
| 11 | −5.8619725E−17 | 2.1869925E−17 | 1.8951588E−18 | 3.0181727E−19 | |
| 12 | −3.0889926E−16 | 5.1694973E−17 | 2.2423508E−18 | 1.0525292E−19 | |

TABLE 7

EXAMPLE 4

| Si | Ri | Di | Ndj | vdj | θgFj |
|---|---|---|---|---|---|
| 1 | 45.0007 | 1.30 | 1.71736 | 29.52 | 0.6047 |
| 2 | 10.5812 | 3.75 | | | |
| 3 | ∞ | 0.86 | 1.80000 | 29.84 | 0.6017 |
| 4 | 9.9517 | 3.00 | | | |
| 5 | −39.8104 | 0.84 | 1.51742 | 52.43 | 0.5564 |
| 6 | 13.3628 | 3.35 | 1.92286 | 20.88 | 0.6388 |
| 7 | −68.9983 | 1.08 | | | |
| 8 | −15.6001 | 1.20 | 1.56883 | 56.36 | 0.5489 |
| 9 | −26.4997 | VARIABLE D9 | | | |
| 10 | ∞ (APERTURE STOP) | VARIABLE D10 | | | |
| 11* | 14.3963 | 3.78 | 1.56868 | 58.27 | 0.5536 |
| 12* | −18.7999 | 0.21 | | | |
| 13 | 136.6379 | 0.76 | 1.56732 | 42.82 | 0.5731 |
| 14 | 16.9648 | 1.31 | | | |
| 15 | 16.8005 | 4.15 | 1.49700 | 81.54 | 0.5375 |
| 16 | −12.2050 | 0.27 | | | |
| 17 | 36.9909 | 1.00 | 1.90366 | 31.32 | 0.5947 |

TABLE 7-continued

EXAMPLE 4

| | | | | | |
|---|---|---|---|---|---|
| 18 | 7.1885 | 4.06 | 1.49700 | 81.54 | 0.5375 |
| 19 | −25.4051 | VARIABLE D19 | | | |
| 20 | ∞ | 1.50 | 1.51633 | 64.14 | 0.5353 |
| 21 | ∞ | 6.35 | | | |
| IMAGE PLANE | ∞ | | | | |

| | FOCAL LENGTH | Fno. | 2ω | VARIABLE D9 | VARIABLE D10 | VARIABLE D19 |
|---|---|---|---|---|---|---|
| WIDE-ANGLE END | 2.89 | 1.38 | 158.7 | 17.10 | 8.56 | 1.00 |
| TELEPHOTO END | 7.81 | 2.18 | 50.0 | 1.67 | 1.42 | 8.14 |

TABLE 8

EXAMPLE 4

| Si | K | A3 | A4 | A5 | A6 |
|---|---|---|---|---|---|
| 11 | 0.0000000E+00 | 2.4731528E−05 | −1.4767865E−04 | 1.2847457E−05 | −2.0140639E−06 |
| 12 | 0.0000000E+00 | 1.8590957E−05 | 1.5466911E−04 | 2.4768486E−06 | 9.8925372E−07 |

| Si | A7 | A8 | A9 | A10 | A11 |
|---|---|---|---|---|---|
| 11 | −1.5435412E−07 | −3.2362239E−09 | 2.2106502E−09 | −1.2205481E−10 | −6.3333639E−14 |
| 12 | −6.5535922E−07 | 6.5461995E−08 | −1.7615358E−09 | 4.9113926E−11 | 2.4295615E−13 |

| Si | A12 | A13 | A14 | A15 | A16 |
|---|---|---|---|---|---|
| 11 | −7.0882731E−13 | −1.1822955E−14 | −8.3289647E−15 | −3.7639460E−15 | −1.1749231E−15 |
| 12 | −5.6507494E−14 | −9.7015623E−15 | −2.2335941E−16 | −2.5893401E−17 | −5.7284309E−16 |

| Si | A17 | A18 | A19 | A20 |
|---|---|---|---|---|
| 11 | −5.8609950E−17 | 2.1872059E−17 | 1.8959254E−18 | 3.0207690E−19 |
| 12 | −3.0890818E−16 | 5.1693973E−17 | 2.2419712E−18 | 1.0512788E−19 |

TABLE 9

EXAMPLE 5

| Si | Ri | Di | Ndj | νdj | θgFj |
|---|---|---|---|---|---|
| 1 | 43.2304 | 1.56 | 1.71736 | 29.52 | 0.6047 |
| 2 | 10.2869 | 3.78 | | | |
| 3 | ∞ | 0.86 | 1.80000 | 29.84 | 0.6017 |
| 4 | 9.9222 | 2.95 | | | |
| 5 | −39.4733 | 0.84 | 1.51742 | 52.43 | 0.5564 |
| 6 | 13.3017 | 3.49 | 1.92286 | 20.88 | 0.6388 |
| 7 | −68.9983 | 1.42 | | | |
| 8 | −15.2001 | 0.78 | 1.59950 | 65.59 | 0.5420 |
| 9 | −25.7998 | VARIABLE D9 | | | |
| 10 | ∞ (APERTURE STOP) | VARIABLE D10 | | | |
| 11* | 14.3963 | 7.31 | 1.56868 | 58.27 | 0.5536 |
| 12* | −18.7999 | 3.77 | | | |
| 13 | −212.4320 | 0.21 | 1.56732 | 42.82 | 0.5731 |
| 14 | 21.6778 | 0.76 | | | |
| 15 | 17.4458 | 1.13 | 1.49700 | 81.54 | 0.5375 |
| 16 | −12.5222 | 4.15 | | | |
| 17 | 32.0808 | 0.20 | 1.90366 | 31.32 | 0.5947 |
| 18 | 7.1779 | 1.00 | 1.49700 | 81.54 | 0.5375 |
| 19 | −24.1470 | VARIABLE D19 | | | |
| 20 | ∞ | 1.50 | 1.51633 | 64.14 | 0.5353 |
| 21 | ∞ | 6.51 | | | |

TABLE 9-continued

EXAMPLE 5

| IMAGE PLANE | ∞ | | | | | |
|---|---|---|---|---|---|---|
| | FOCAL LENGTH | Fno. | 2ω | VARIABLE D9 | VARIABLE D10 | VARIABLE D19 |
| WIDE-ANGLE END | 2.89 | 1.33 | 157.3 | 15.32 | 8.56 | 1.00 |
| TELEPHOTO END | 7.80 | 2.16 | 50.1 | 1.40 | 1.26 | 8.30 |

TABLE 10

EXAMPLE 5

| Si | K | A3 | A4 | A5 | A6 |
|---|---|---|---|---|---|
| 11 | 0.0000000E+00 | 2.4731528E−05 | −1.4570630E−04 | 1.2847457E−05 | −1.9896915E−06 |
| 12 | 0.0000000E+00 | 1.8590957E−05 | 1.5641905E−04 | 2.4768486E−06 | 1.0230312E−06 |

| Si | A7 | A8 | A9 | A10 | A11 |
|---|---|---|---|---|---|
| 11 | −1.5435412E−07 | −3.3921278E−09 | 2.2106502E−09 | −1.1839908E−10 | −6.3333639E−14 |
| 12 | −6.5535922E−07 | 6.5115549E−08 | −1.7615358E−09 | 4.7938695E−11 | 2.4295615E−13 |

| Si | A12 | A13 | A14 | A15 | A16 |
|---|---|---|---|---|---|
| 11 | −7.2661697E−13 | −1.1822955E−14 | −9.2101975E−15 | −3.7639460E−15 | −1.1750309E−15 |
| 12 | −2.4080700E−14 | −9.7015623E−15 | 1.1542768E−15 | −2.5893401E−17 | −5.5344483E−16 |

| Si | A17 | A18 | A19 | A20 | |
|---|---|---|---|---|---|
| 11 | −5.8619645E−17 | 2.2373778E−17 | 1.8951666E−18 | 3.1806991E−19 | |
| 12 | −3.0889925E−16 | 5.1745569E−17 | 2.2423504E−18 | 1.0532489E−19 | |

TABLE 11

EXAMPLE 6

| Si | Ri | Di | Ndj | νdj | θgFj |
|---|---|---|---|---|---|
| 1 | 36.1165 | 1.52 | 1.73800 | 32.26 | 0.5899 |
| 2 | 10.7525 | 3.75 | | | |
| 3 | −1255.2802 | 0.86 | 1.80000 | 29.84 | 0.6017 |
| 4 | 9.6553 | 2.95 | | | |
| 5 | −52.7881 | 0.84 | 1.51742 | 52.43 | 0.5564 |
| 6 | 12.7465 | 3.35 | 1.92286 | 20.88 | 0.6388 |
| 7 | −68.9983 | 1.10 | | | |
| 8 | −15.2000 | 0.82 | 1.57099 | 50.80 | 0.5588 |
| 9 | −37.8558 | VARIABLE D9 | | | |
| 10 | ∞ (APERTURE STOP) | VARIABLE D10 | | | |
| 11* | 14.2999 | 3.64 | 1.56868 | 58.27 | 0.5536 |
| 12* | −19.5205 | 0.21 | | | |
| 13 | −78.8269 | 0.76 | 1.59551 | 39.24 | 0.5803 |
| 14 | 25.3387 | 0.96 | | | |
| 15 | 17.6248 | 4.34 | 1.49700 | 81.54 | 0.5375 |
| 16 | −12.6271 | 0.20 | | | |
| 17 | 24.0938 | 1.00 | 1.90366 | 31.32 | 0.5947 |
| 18 | 7.1000 | 4.00 | 1.49700 | 81.54 | 0.5375 |
| 19 | −27.0564 | VARIABLE D19 | | | |
| 20 | ∞ | 1.50 | 1.51633 | 64.14 | 0.5353 |
| 21 | ∞ | 6.47 | | | |
| IMAGE PLANE | ∞ | | | | |

TABLE 11-continued

EXAMPLE 6

| | FOCAL LENGTH | Fno. | 2ω | VARIABLE D9 | VARIABLE D10 | VARIABLE D19 |
|---|---|---|---|---|---|---|
| WIDE-ANGLE END | 2.90 | 1.31 | 158.6 | 14.59 | 8.56 | 1.00 |
| TELEPHOTO END | 7.83 | 2.09 | 49.9 | 1.53 | 1.33 | 8.23 |

TABLE 12

EXAMPLE 6

| Si | K | A3 | A4 | A5 | A6 |
|---|---|---|---|---|---|
| 11 | 0.0000000E+00 | 8.8839991E−05 | −1.4767865E−04 | 1.2163204E−05 | −2.0140639E−06 |
| 12 | 0.0000000E+00 | 6.6428694E−05 | 1.5466911E−04 | 1.6823674E−06 | 9.8925372E−07 |

| Si | A7 | A8 | A9 | A10 | A11 |
|---|---|---|---|---|---|
| 11 | −1.5465298E−07 | −3.2362239E−09 | 2.2027264E−09 | −1.2205481E−10 | −6.1142731E−14 |
| 12 | −6.5535953E−07 | 6.5461995E−08 | −1.7653805E−09 | 4.9113926E−11 | 2.4194200E−13 |

| Si | A12 | A13 | A14 | A15 | A16 |
|---|---|---|---|---|---|
| 11 | −7.0882731E−13 | −1.2022902E−14 | −8.3289647E−15 | −3.7639460E−15 | −1.1749231E−15 |
| 12 | −5.6507494E−14 | −9.1789748E−15 | −2.2335941E−16 | −2.5893401E−17 | −5.7284309E−16 |

| Si | A17 | A18 | A19 | A20 |
|---|---|---|---|---|
| 11 | −5.8619725E−17 | 2.1869925E−17 | 1.8951588E−18 | 3.0181727E−19 |
| 12 | −3.0889926E−16 | 5.1694973E−17 | 2.2423508E−18 | 1.0525292E−19 |

TABLE 13

EXAMPLE 7

| Si | Ri | Di | Ndj | νdj | θgFj |
|---|---|---|---|---|---|
| 1 | 42.9298 | 1.41 | 1.69895 | 30.13 | 0.6030 |
| 2 | 10.5205 | 3.89 | | | |
| 3 | −179.2163 | 0.86 | 1.80000 | 29.84 | 0.6017 |
| 4 | 10.0184 | 2.95 | | | |
| 5 | −45.3562 | 1.16 | 1.51742 | 52.43 | 0.5564 |
| 6 | 13.6879 | 3.35 | 1.92286 | 20.88 | 0.6388 |
| 7 | −82.9570 | 1.06 | | | |
| 8 | −16.2001 | 0.82 | 1.58913 | 61.14 | 0.5407 |
| 9 | −25.7998 | VARIABLE D9 | | | |
| 10 | ∞ (APERTURE STOP) | VARIABLE D10 | | | |
| 11* | 14.3963 | 3.76 | 1.56868 | 58.27 | 0.5536 |
| 12* | −18.7999 | 0.21 | | | |
| 13 | −311.9117 | 0.76 | 1.56732 | 42.82 | 0.5731 |
| 14 | 19.2239 | 1.24 | | | |
| 15 | 17.2710 | 4.15 | 1.49700 | 81.54 | 0.5375 |
| 16 | −12.3216 | 0.29 | | | |
| 17 | 33.5543 | 1.00 | 1.90366 | 31.32 | 0.5947 |
| 18 | 7.2965 | 4.01 | 1.49700 | 81.54 | 0.5375 |
| 19 | −24.4765 | VARIABLE D19 | | | |
| 20 | ∞ | 1.50 | 1.51633 | 64.14 | 0.5353 |
| 21 | ∞ | 6.66 | | | |
| IMAGE PLANE | ∞ | | | | |

| | FOCAL LENGTH | Fno. | 2ω | VARIABLE D9 | VARIABLE D10 | VARIABLE D19 |
|---|---|---|---|---|---|---|
| WIDE-ANGLE END | 2.90 | 1.35 | 159.3 | 16.38 | 8.56 | 1.00 |
| TELEPHOTO END | 7.83 | 2.19 | 50.0 | 1.67 | 1.25 | 8.31 |

TABLE 14

| | | EXAMPLE 7 | | | |
|---|---|---|---|---|---|
| Si | K | A3 | A4 | A5 | A6 |
| 11 | 0.0000000E+00 | 2.4731528E−05 | −1.4538051E−04 | 1.2847457E−05 | −2.0129599E−06 |
| 12 | 0.0000000E+00 | 1.8590957E−05 | 1.5700725E−04 | 2.4768486E−06 | 9.8580142E−07 |
| Si | A7 | A8 | A9 | A10 | A11 |
| 11 | −1.5435412E−07 | −3.2362239E−09 | 2.2106502E−09 | −1.2205481E−10 | −6.3333639E−14 |
| 12 | −6.5535922E−07 | 6.5461995E−08 | −1.7615358E−09 | 4.9113926E−11 | 2.4295615E−13 |
| Si | A12 | A13 | A14 | A15 | A16 |
| 11 | −7.0882731E−13 | −1.1822955E−14 | −8.3289647E−15 | −3.7639460E−15 | −1.1749231E−15 |
| 12 | −5.6507494E−14 | −9.7015623E−15 | −2.2335941E−16 | −2.5893401E−17 | −5.7284309E−16 |
| Si | A17 | A18 | A19 | A20 | |
| 11 | −5.8619725E−17 | 2.1869925E−17 | 1.8951588E−18 | 3.0181727E−19 | |
| 12 | −3.0889926E−16 | 5.1694973E−17 | 2.2423508E−18 | 1.0525292E−19 | |

TABLE 15

| | | EXAMPLE 8 | | | |
|---|---|---|---|---|---|
| Si | Ri | Di | Ndj | νdj | θgFj |
| 1 | 45.0000 | 1.30 | 1.69895 | 30.13 | 0.6030 |
| 2 | 10.3073 | 3.75 | | | |
| 3 | 99.9964 | 0.86 | 1.80000 | 29.84 | 0.6017 |
| 4 | 9.6649 | 3.18 | | | |
| 5 | −30.9522 | 0.94 | 1.51742 | 52.43 | 0.5564 |
| 6 | 13.6906 | 3.35 | 1.92286 | 20.88 | 0.6388 |
| 7 | −69.0000 | 1.12 | | | |
| 8 | −15.1171 | 0.82 | 1.56883 | 56.36 | 0.5489 |
| 9 | −25.5998 | VARIABLE D9 | | | |
| 10 | ∞ (APERTURE STOP) | VARIABLE D10 | | | |
| 11* | 14.3963 | 3.78 | 1.56868 | 58.27 | 0.5536 |
| 12* | −18.7999 | 0.26 | | | |
| 13 | ∞ | 0.87 | 1.56732 | 42.82 | 0.5731 |
| 14 | 19.0487 | 1.10 | | | |
| 15 | 16.9559 | 4.15 | 1.49700 | 81.54 | 0.5375 |
| 16 | −12.3320 | 0.20 | | | |
| 17 | 33.4385 | 1.00 | 1.90366 | 31.32 | 0.5947 |
| 18 | 7.1880 | 4.00 | 1.49700 | 81.54 | 0.5375 |
| 19 | −25.0656 | VARIABLE D19 | | | |
| 20 | ∞ | 1.50 | 1.51633 | 64.14 | 0.5353 |
| 21 | ∞ | 6.48 | | | |
| IMAGE PLANE | ∞ | | | | |

| | FOCAL LENGTH | Fno. | 2ω | VARIABLE D9 | VARIABLE D10 | VARIABLE D19 |
|---|---|---|---|---|---|---|
| WIDE-ANGLE END | 2.90 | 1.34 | 153.7 | 16.23 | 8.56 | 1.00 |
| TELEPHOTO END | 7.83 | 2.16 | 49.9 | 1.61 | 1.35 | 8.21 |

TABLE 16

| | | EXAMPLE 8 | | | |
|---|---|---|---|---|---|
| Si | K | A3 | A4 | A5 | A6 |
| 11 | 0.0000000E+00 | 3.0658952E−05 | −1.4767865E−04 | 1.3275139E−05 | −2.0140639E−06 |
| 12 | 0.0000000E+00 | 2.2330075E−05 | 1.5466911E−04 | 2.9943397E−06 | 9.8925372E−07 |

TABLE 16-continued

EXAMPLE 8

| Si | A7 | A8 | A9 | A10 | A11 |
|---|---|---|---|---|---|
| 11 | −1.5287366E−07 | −3.2362239E−09 | 2.2102878E−09 | −1.2205481E−10 | −6.3385963E−14 |
| 12 | −6.5606444E−07 | 6.5461995E−08 | −1.7610383E−09 | 4.9113926E−11 | 2.4329090E−13 |

| Si | A12 | A13 | A14 | A15 | A16 |
|---|---|---|---|---|---|
| 11 | −7.0882731E−13 | −1.1822955E−14 | −8.3289647E−15 | −3.7639460E−15 | −1.1749231E−15 |
| 12 | −5.6507494E−14 | −9.7015623E−15 | −2.2335941E−16 | −2.5893401E−17 | −5.7284309E−16 |

| Si | A17 | A18 | A19 | A20 |
|---|---|---|---|---|
| 11 | −5.8619725E−17 | 2.1869925E−17 | 1.8951588E−18 | 3.0181727E−19 |
| 12 | −3.0889926E−16 | 5.1694973E−17 | 2.2423508E−18 | 1.0525292E−19 |

TABLE 17

EXAMPLE 9

| Si | Ri | Di | Ndj | νdj | θgFj |
|---|---|---|---|---|---|
| 1 | 42.9457 | 1.45 | 1.69895 | 30.13 | 0.6030 |
| 2 | 11.0000 | 3.82 | | | |
| 3 | −113.9273 | 0.86 | 1.80000 | 29.84 | 0.6017 |
| 4 | 9.9721 | 2.95 | | | |
| 5 | −43.7395 | 0.84 | 1.51742 | 52.43 | 0.5564 |
| 6 | 13.4801 | 3.35 | 1.92286 | 20.88 | 0.6388 |
| 7 | −68.9983 | 1.11 | | | |
| 8 | −15.2001 | 0.82 | 1.56883 | 56.36 | 0.5489 |
| 9 | −25.5998 | VARIABLE D9 | | | |
| 10 | ∞ (APERTURE STOP) | VARIABLE D10 | | | |
| 11* | 14.3963 | 3.78 | 1.56868 | 58.27 | 0.5536 |
| 12* | −18.7999 | 0.21 | | | |
| 13 | −341.6947 | 0.76 | 1.56732 | 42.82 | 0.5731 |
| 14 | 21.2217 | 1.10 | | | |
| 15 | 17.3405 | 4.15 | 1.49700 | 81.54 | 0.5375 |
| 16 | −12.4959 | 0.20 | | | |
| 17 | 35.1165 | 1.00 | 1.90366 | 31.32 | 0.5947 |
| 18 | 7.2155 | 4.11 | 1.49700 | 81.54 | 0.5375 |
| 19 | −23.3631 | VARIABLE D19 | | | |
| 20 | ∞ | 1.50 | 1.51633 | 64.14 | 0.5353 |
| 21 | ∞ | 6.49 | | | |
| IMAGE PLANE | ∞ | | | | |

| | FOCAL LENGTH | Fno. | 2ω | VARIABLE D9 | VARIABLE D10 | VARIABLE D19 |
|---|---|---|---|---|---|---|
| WIDE-ANGLE END | 2.92 | 1.34 | 165.1 | 16.18 | 8.56 | 1.00 |
| TELEPHOTO END | 7.87 | 2.16 | 49.8 | 1.72 | 1.33 | 8.23 |

TABLE 18

EXAMPLE 9

| Si | K | A3 | A4 | A5 | A6 |
|---|---|---|---|---|---|
| 11 | 0.0000000E+00 | 2.4731528E−05 | −1.4767865E−04 | 1.2847457E−05 | −2.0140639E−06 |
| 12 | 0.0000000E+00 | 1.8590957E−05 | 1.5466911E−04 | 2.4768486E−06 | 9.8925372E−07 |

| Si | A7 | A8 | A9 | A10 | A11 |
|---|---|---|---|---|---|
| 11 | −1.5435412E−07 | −3.2362239E−09 | 2.2106502E−09 | −1.2205481E−10 | −6.3333639E−14 |
| 12 | −6.5535922E−07 | 6.5461995E−08 | −1.7615358E−09 | 4.9113926E−11 | 2.4295615E−13 |

TABLE 18-continued

EXAMPLE 9

| Si | A12 | A13 | A14 | A15 | A16 |
|----|-----|-----|-----|-----|-----|
| 11 | −7.0882731E−13 | −1.1822955E−14 | −8.3289647E−15 | −3.7639460E−15 | −1.1749231E−15 |
| 12 | −5.6507494E−14 | −9.7015623E−15 | −2.2335941E−16 | −2.5893401E−17 | −5.7284309E−16 |

| Si | A17 | A18 | A19 | A20 |
|----|-----|-----|-----|-----|
| 11 | −5.8619725E−17 | 2.1869925E−17 | 1.8951588E−18 | 3.0181727E−19 |
| 12 | −3.0889926E−16 | 5.1694973E−17 | 2.2423508E−18 | 1.0525292E−19 |

TABLE 19

EXAMPLE 10

| Si | Ri | Di | Ndj | νdj | θgFj |
|----|-----|-----|-----|-----|------|
| 1 | 27.7558 | 1.39 | 1.81600 | 46.62 | 0.5568 |
| 2 | 11.3755 | 3.38 | | | |
| 3 | 20.5844 | 1.08 | 1.81600 | 46.62 | 0.5568 |
| 4 | 8.8654 | 2.90 | | | |
| 5 | 20.4189 | 1.23 | 1.78800 | 47.37 | 0.5559 |
| 6 | 9.8415 | 3.05 | | | |
| 7 | −57.3998 | 3.81 | 1.83481 | 42.73 | 0.5648 |
| 8 | 23.0870 | 1.00 | | | |
| 9 | 19.8954 | 2.36 | 1.95906 | 17.47 | 0.6598 |
| 10 | 119.8999 | VARIABLE D10 | | | |
| 11 | ∞ (APERTURE STOP) | VARIABLE D11 | | | |
| 12* | 14.3963 | 3.78 | 1.56868 | 58.27 | 0.5536 |
| 13* | −18.7999 | 0.24 | | | |
| 14 | ∞ | 0.76 | 1.58144 | 40.75 | 0.5774 |
| 15 | 24.0250 | 0.96 | | | |
| 16 | 17.4260 | 4.16 | 1.49700 | 81.54 | 0.5375 |
| 17 | −12.6873 | 0.43 | | | |
| 18 | 34.0024 | 0.69 | 1.90366 | 31.32 | 0.5947 |
| 19 | 6.7860 | 4.27 | 1.49700 | 81.54 | 0.5375 |
| 20 | −22.0524 | VARIABLE D20 | | | |
| 21 | ∞ | 1.5 | 1.51633 | 64.14 | 0.5353 |
| 22 | ∞ | 6.35 | | | |
| IMAGE PLANE | ∞ | | | | |

| | FOCAL LENGTH | Fno. | 2ω | VARIABLE D10 | VARIABLE D11 | VARIABLE D20 |
|---|---|---|---|---|---|---|
| WIDE-ANGLE END | 2.24 | 1.34 | 164.2 | 13.98 | 9.03 | 1.00 |
| TELEPHOTO END | 5.97 | 2.17 | 62.8 | 1.80 | 1.54 | 8.50 |

TABLE 20

EXAMPLE 10

| Si | K | A3 | A4 | A5 | A6 |
|----|---|----|----|----|----|
| 12 | 0.0000000E+00 | 2.4731528E−05 | −1.4767865E−04 | 1.2847457E−05 | −2.0140639E−06 |
| 13 | 0.0000000E+00 | 1.8590957E−05 | 1.5466911E−04 | 2.4768486E−06 | 9.8925372E−07 |

| Si | A7 | A8 | A9 | A10 | A11 |
|----|----|----|----|-----|-----|
| 12 | −1.5435412E−07 | −3.2362239E−09 | 2.2106502E−09 | −1.2205481E−10 | −6.3333639E−14 |
| 13 | −6.5535922E−07 | 6.5461995E−08 | −1.7615358E−09 | 4.9113926E−11 | 2.4295615E−13 |

| Si | A12 | A13 | A14 | A15 | A16 |
|----|-----|-----|-----|-----|-----|
| 12 | −7.0882731E−13 | −1.1822955E−14 | −8.3289647E−15 | −3.7639460E−15 | −1.1749231E−15 |
| 13 | −5.6507494E−14 | −9.7015623E−15 | −2.2335941E−16 | −2.5893401E−17 | −5.7284309E−16 |

TABLE 20-continued

EXAMPLE 10

| Si | A17 | A18 | A19 | A20 |
|---|---|---|---|---|
| 12 | −5.8619725E−17 | 2.1869925E−17 | 1.8951588E−18 | 3.0181727E−19 |
| 13 | −3.0889926E−16 | 5.1694973E−17 | 2.2423508E−18 | 1.0525292E−19 |

TABLE 21

EXAMPLE 11

| Si | Ri | Di | Ndj | νdj | θgFj |
|---|---|---|---|---|---|
| 1 | 28.1107 | 1.38 | 1.81600 | 46.62 | 0.5568 |
| 2 | 11.3699 | 3.27 | | | |
| 3 | 19.8752 | 1.03 | 1.81600 | 46.62 | 0.5568 |
| 4 | 8.8400 | 2.99 | | | |
| 5 | 22.0299 | 0.98 | 1.77250 | 49.60 | 0.5520 |
| 6 | 10.1691 | 3.05 | | | |
| 7 | −77.3028 | 4.88 | 1.83481 | 42.73 | 0.5648 |
| 8 | 21.6719 | 1.00 | | | |
| 9 | 19.4507 | 1.96 | 1.95906 | 17.47 | 0.6598 |
| 10 | 90.0351 | VARIABLE D10 | | | |
| 11 | ∞ (APERTURE STOP) | VARIABLE D11 | | | |
| 12* | 14.3963 | 3.78 | 1.56868 | 58.27 | 0.5536 |
| 13* | −18.7999 | 0.37 | | | |
| 14 | −943.1605 | 0.78 | 1.67300 | 38.15 | 0.5754 |
| 15 | 27.2420 | 0.90 | | | |
| 16 | 17.9974 | 3.95 | 1.49700 | 81.54 | 0.5375 |
| 17 | −12.5801 | 0.68 | | | |
| 18 | 32.1594 | 0.68 | 1.90366 | 31.32 | 0.5947 |
| 19 | 6.7854 | 4.22 | 1.49700 | 81.54 | 0.5375 |
| 20 | −22.9232 | VARIABLE D20 | | | |
| 21 | ∞ | 1.50 | 1.51633 | 64.14 | 0.5353 |
| 22 | ∞ | 6.28 | | | |
| IMAGE PLANE | ∞ | | | | |

| | FOCAL LENGTH | Fno. | 2ω | VARIABLE D10 | VARIABLE D11 | VARIABLE D20 |
|---|---|---|---|---|---|---|
| WIDE-ANGLE END | 2.25 | 1.34 | 164.4 | 13.98 | 9.00 | 1.00 |
| TELEPHOTO END | 5.97 | 2.20 | 62.6 | 1.81 | 1.46 | 8.54 |

TABLE 22

EXAMPLE 11

| Si | K | A3 | A4 | A5 | A6 |
|---|---|---|---|---|---|
| 12 | 0.0000000E+00 | 2.4731528E−05 | −1.4767865E−04 | 1.2847457E−05 | −2.0140639E−06 |
| 13 | 0.0000000E+00 | 1.8590957E−05 | 1.5466911E−04 | 2.4768486E−06 | 9.8925372E−07 |

| Si | A7 | A8 | A9 | A10 | A11 |
|---|---|---|---|---|---|
| 12 | −1.5435412E−07 | −3.2362239E−09 | 2.2106502E−09 | −1.2205481E−10 | −6.3333639E−14 |
| 13 | −6.5535922E−07 | 6.5461995E−08 | −1.7615358E−09 | 4.9113926E−11 | 2.4295615E−13 |

| Si | A12 | A13 | A14 | A15 | A16 |
|---|---|---|---|---|---|
| 12 | −7.0882731E−13 | −1.1822955E−14 | −8.3289647E−15 | −3.7639460E−15 | −1.1749231E−15 |
| 13 | −5.6507494E−14 | −9.7015623E−15 | −2.2335941E−16 | −2.5893401E−17 | −5.7284309E−16 |

| Si | A17 | A18 | A19 | A20 |
|---|---|---|---|---|
| 12 | −5.8619725E−17 | 2.1869925E−17 | 1.8951588E−18 | 3.0181727E−19 |
| 13 | −3.0889926E−16 | 5.1694973E−17 | 2.2423508E−18 | 1.0525292E−19 |

TABLE 23

EXAMPLE 12

| Si | Ri | Di | Ndj | vdj | θgFj |
|---|---|---|---|---|---|
| 1 | 26.5999 | 1.30 | 1.81600 | 46.62 | 0.5568 |
| 2 | 10.9400 | 3.20 | | | |
| 3 | 18.0742 | 1.01 | 1.81600 | 46.62 | 0.5568 |
| 4 | 8.4900 | 3.52 | | | |
| 5 | 20.9736 | 0.89 | 1.77250 | 49.60 | 0.5520 |
| 6 | 10.5396 | 3.00 | | | |
| 7 | −43.1810 | 5.06 | 1.83481 | 42.73 | 0.5648 |
| 8 | 25.5662 | 1.00 | | | |
| 9 | 21.9630 | 1.95 | 1.95906 | 17.47 | 0.6598 |
| 10 | 171.0658 | VARIABLE D10 | | | |
| 11 | ∞ (APERTURE STOP) | VARIABLE D11 | | | |
| 12* | 14.3963 | 3.78 | 1.56868 | 58.27 | 0.5536 |
| 13* | −18.7999 | 0.50 | | | |
| 14 | −8290.4077 | 0.76 | 1.72342 | 37.95 | 0.5836 |
| 15 | 27.8860 | 0.88 | | | |
| 16 | 18.1350 | 3.90 | 1.49700 | 81.54 | 0.5375 |
| 17 | −12.4983 | 0.69 | | | |
| 18 | 31.5864 | 0.68 | 1.90366 | 31.32 | 0.5947 |
| 19 | 6.7800 | 4.20 | 1.49700 | 81.54 | 0.5375 |
| 20 | −23.0930 | VARIABLE D20 | | | |
| 21 | ∞ | 1.50 | 1.51633 | 64.14 | 0.5353 |
| 22 | ∞ | 6.31 | | | |
| IMAGE PLANE | ∞ | | | | |

| | FOCAL LENGTH | Fno. | 2ω | VARIABLE D10 | VARIABLE D11 | VARIABLE D20 |
|---|---|---|---|---|---|---|
| WIDE-ANGLE END | 2.26 | 1.34 | 161.8 | 13.98 | 8.46 | 1.00 |
| TELEPHOTO END | 6.00 | 2.22 | 62.2 | 1.79 | 0.89 | 8.58 |

TABLE 24

EXAMPLE 12

| Si | K | A3 | A4 | A5 | A6 |
|---|---|---|---|---|---|
| 12 | 0.0000000E+00 | 2.4731528E−05 | −1.4767865E−04 | 1.2847457E−05 | −2.0140639E−06 |
| 13 | 0.0000000E+00 | 1.8590957E−05 | 1.5466911E−04 | 2.4768486E−06 | 9.8925372E−07 |

| Si | A7 | A8 | A9 | A10 | A11 |
|---|---|---|---|---|---|
| 12 | −1.5435412E−07 | −3.2362239E−09 | 2.2106502E−09 | −1.2205481E−10 | −6.3333639E−14 |
| 13 | −6.5535922E−07 | 6.5461995E−08 | −1.7615358E−09 | 4.9113926E−11 | 2.4295615E−13 |

| Si | A12 | A13 | A14 | A15 | A16 |
|---|---|---|---|---|---|
| 12 | −7.0882731E−13 | −1.1822955E−14 | −8.3289647E−15 | −3.7639460E−15 | −1.1749231E−15 |
| 13 | −5.6507494E−14 | −9.7015623E−15 | −2.2335941E−16 | −2.5893401E−17 | −5.7284309E−16 |

| Si | A17 | A18 | A19 | A20 |
|---|---|---|---|---|
| 12 | −5.8619725E−17 | 2.1869925E−17 | 1.8951588E−18 | 3.0181727E−19 |
| 13 | −3.0889926E−16 | 5.1694973E−17 | 2.2423508E−18 | 1.0525292E−19 |

The schematic structure of the variable magnification optical system in Example 1 will be described. In the variable magnification optical system in Example 1, first lens group G1 consists of five lenses of first lens L1 that is a negative meniscus lens having a concave image-side surface, second lens L2 that is a plano-concave lens having a plane object-side surface, a cemented lens of double-concave third lens L3 and double-convex fourth lens L4 cemented together, and fifth lens L5 that is a negative meniscus lens having a concave object-side surface, and second lens group G2 consists of five lenses of double-convex sixth lens L6, double concave seventh lens L7, double-convex eighth lens L8, and a cemented lens of ninth lens L9 that has a negative meniscus shape having a concave image-side surface and double-convex tenth lens L10 cemented together in this order from the object side. Either surface of sixth lens L6 is an aspherical surface. Aperture stop St is fixed during magnification change.

The schematic structure of the variable magnification optical systems in Examples 2 and 5 is similar to that of Example 1, which has been described already. The schematic structure of the variable magnification optical systems in Examples 3 and 4 differs from that of Example 1 only in that seventh lens L7 has a negative meniscus shape having a concave image-side surface. The schematic structure of the variable magnification optical systems in Examples 6, 7 and 9 differs from that of Example 1 only in that second lens L2 has a double-concave shape. The schematic structure of the variable magnification optical system in Example 8 differs from that of Example 1 only in that second lens L2 has a negative meniscus shape having a concave image-side surface and seventh lens L7 has a plano-concave shape having a plane object-side surface.

The schematic structure of the variable magnification optical system in Example 10 will be described. In the variable magnification optical system in Example 10, first lens group G1 consists of five lenses of first lens L1 that is a negative meniscus lens having a concave image-side surface, second lens L2 that is a negative meniscus lens having a concave image-side surface, third lens L3 that is a negative meniscus lens having a concave image-side surface, double-concave fourth lens L4, and fifth lens L5 that is a positive meniscus lens having a concave image-side surface, and second lens group G2 consists of five lenses of double-convex sixth lens L6, plano-concave seventh lens L7 having a plane object-side surface, double-convex eighth lens L8, and a cemented lens of ninth lens L9 that has a negative meniscus shape having a concave image-side surface and double-convex tenth lens L10 cemented together in this order from the object side. Either surface of sixth lens L6 is an aspherical surface. Aperture stop St is fixed during magnification change. The schematic structure of the variable magnification optical systems in Examples 11 and 12 differ from Example 10 only in that seventh lens L7 is a double-concave lens.

Figure 2:
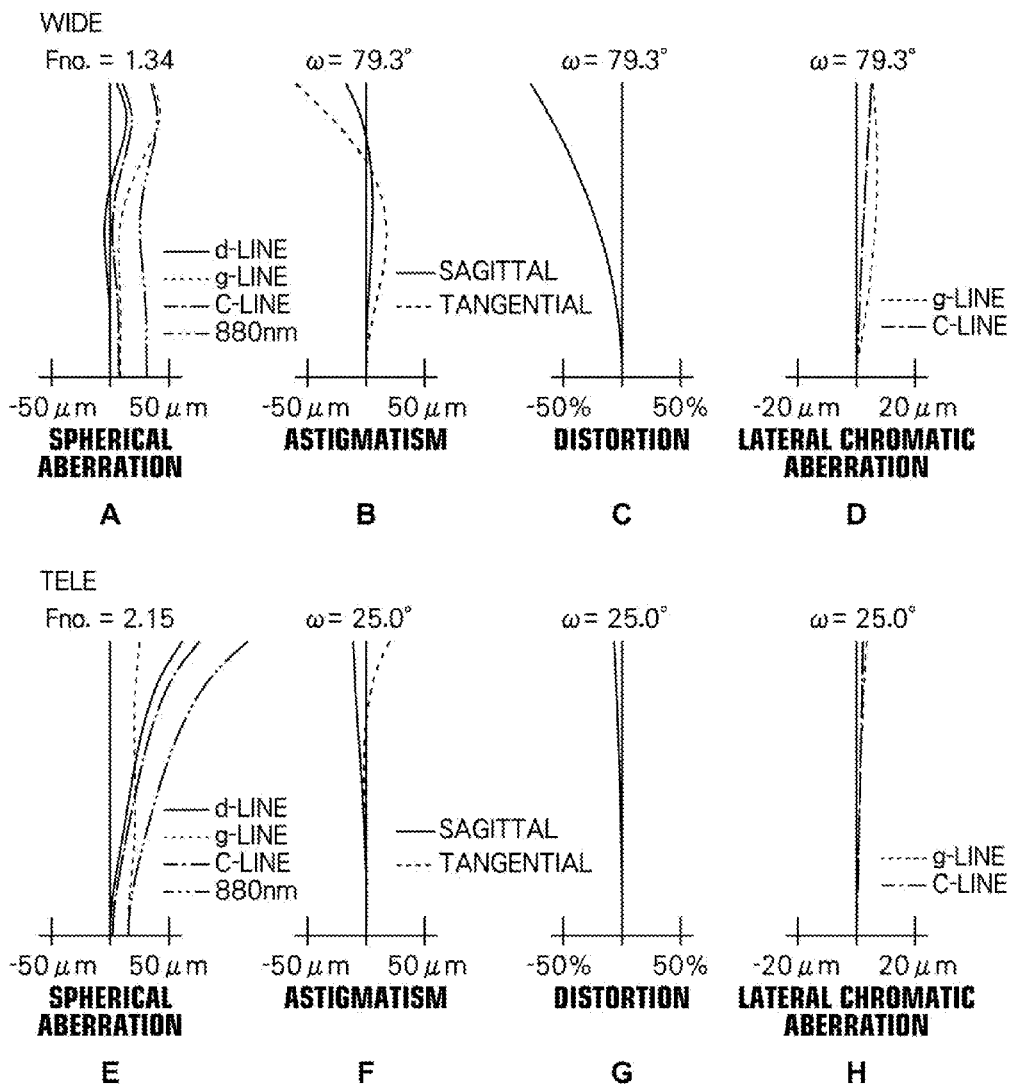
FIG. 2, Sections A through H are aberration diagrams of the variable magnification optical system in Example 1 of the present invention.

FIG. 2, Sections A through D show a spherical aberration, astigmatism, distortion (distortion aberration), and a lateral chromatic aberration (a chromatic aberration of magnification) of the variable magnification optical system in Example 1 at a wide-angle end, respectively. FIG. 2, Sections E through H show a spherical aberration, astigmatism, distortion (distortion aberration), and a lateral chromatic aberration (a chromatic aberration of magnification) of the variable magnification optical system in Example 1 at a telephoto end, respectively. Each aberration diagram is based on d-line, but in the diagram of the spherical aberration, aberrations for g-line (wavelength of 435.8 nm), C-line (wavelength of 656.3 nm), and the wavelength of 880 nm are also illustrated. In the diagram of lateral chromatic aberration, aberrations for g-line and C-line are illustrated. In the diagram of astigmatism, an aberration in a sagittal direction is indicated by a solid line, and an aberration in a tangential direction is indicated by a broken line. In the diagram of the spherical aberration, Fno. represents F-number, and in the other aberration diagrams, ω represents a half angle of view.

Figure 4:
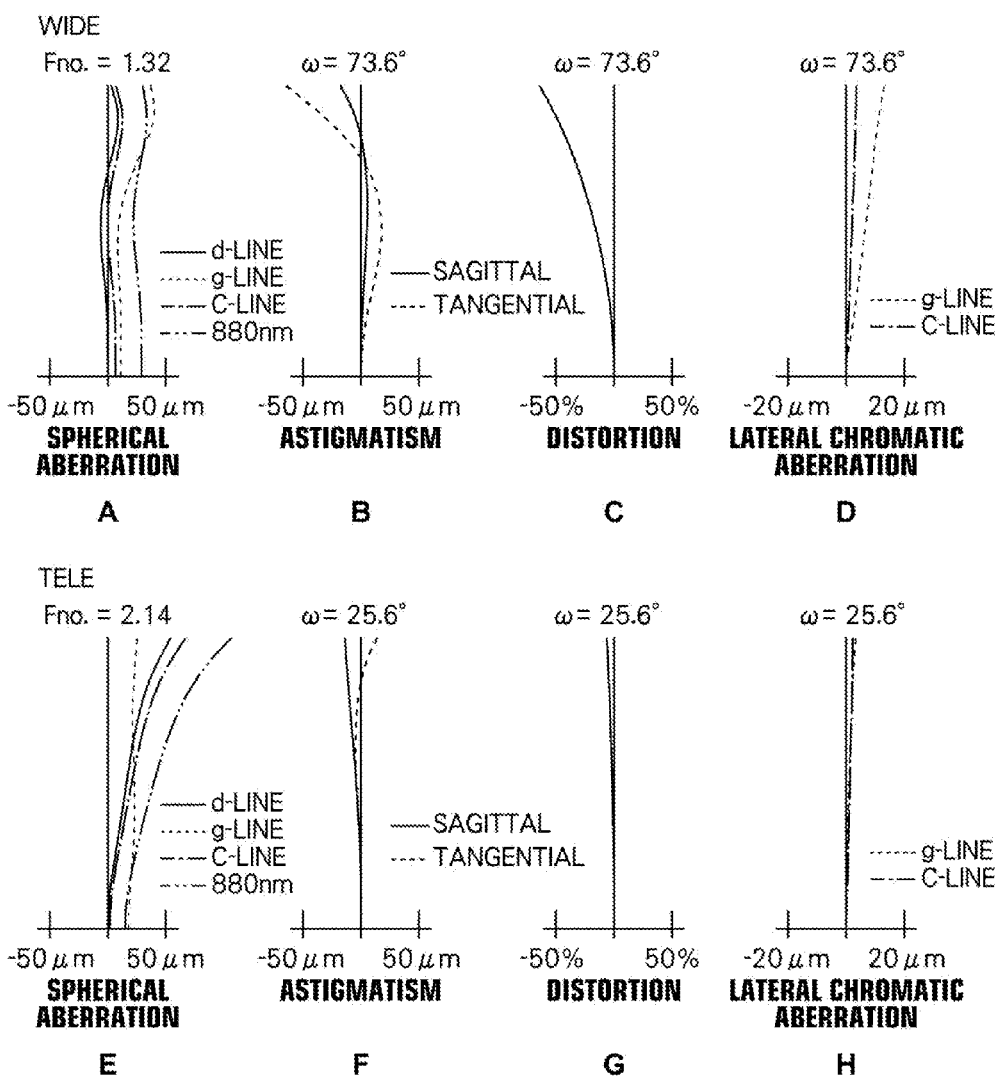
FIG. 4, Sections A through H are aberration diagrams of the variable magnification optical system in Example 2 of the present invention.
Figure 6:
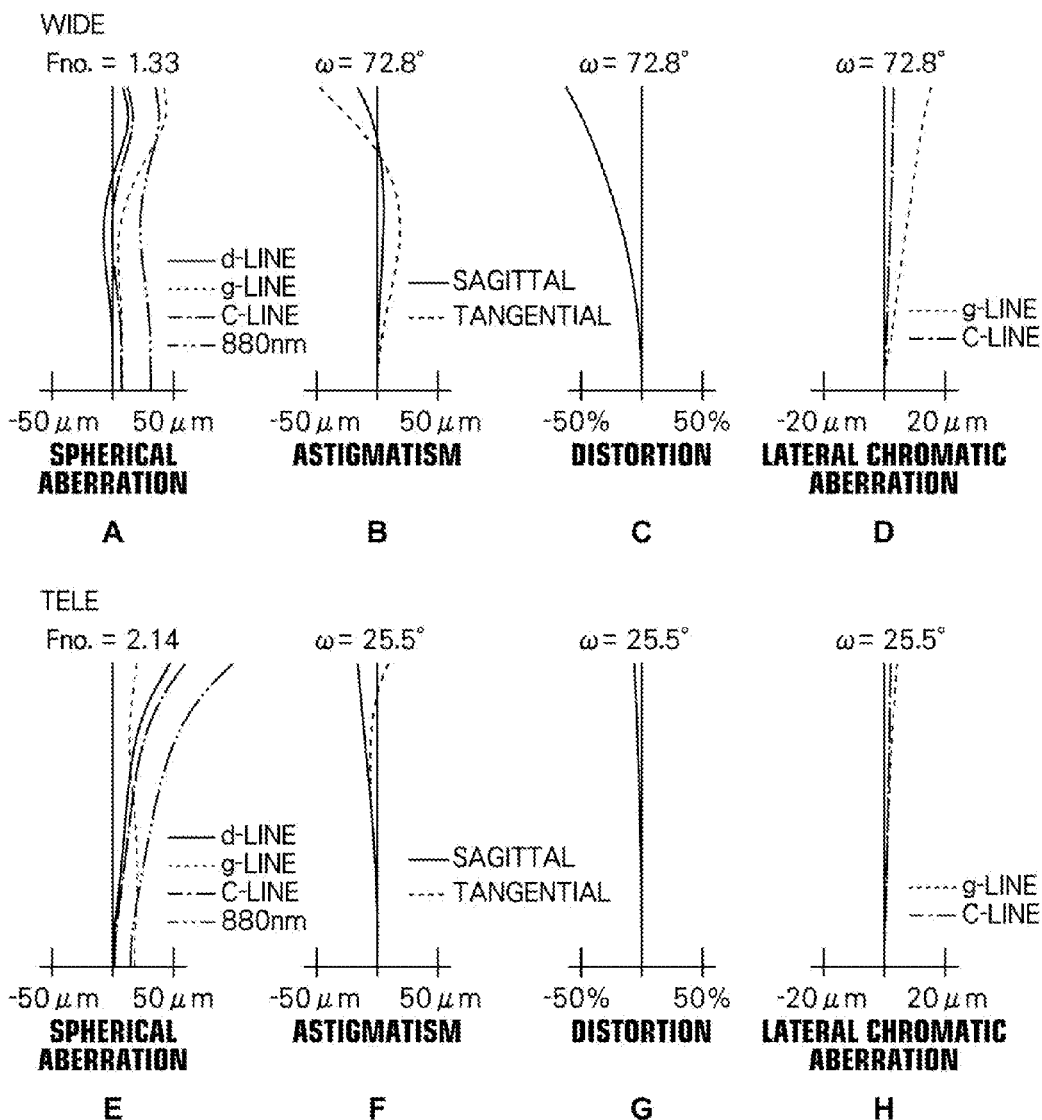
FIG. 6, Sections A through H are aberration diagrams of the variable magnification optical system in Example 3 of the present invention.
Figure 8:
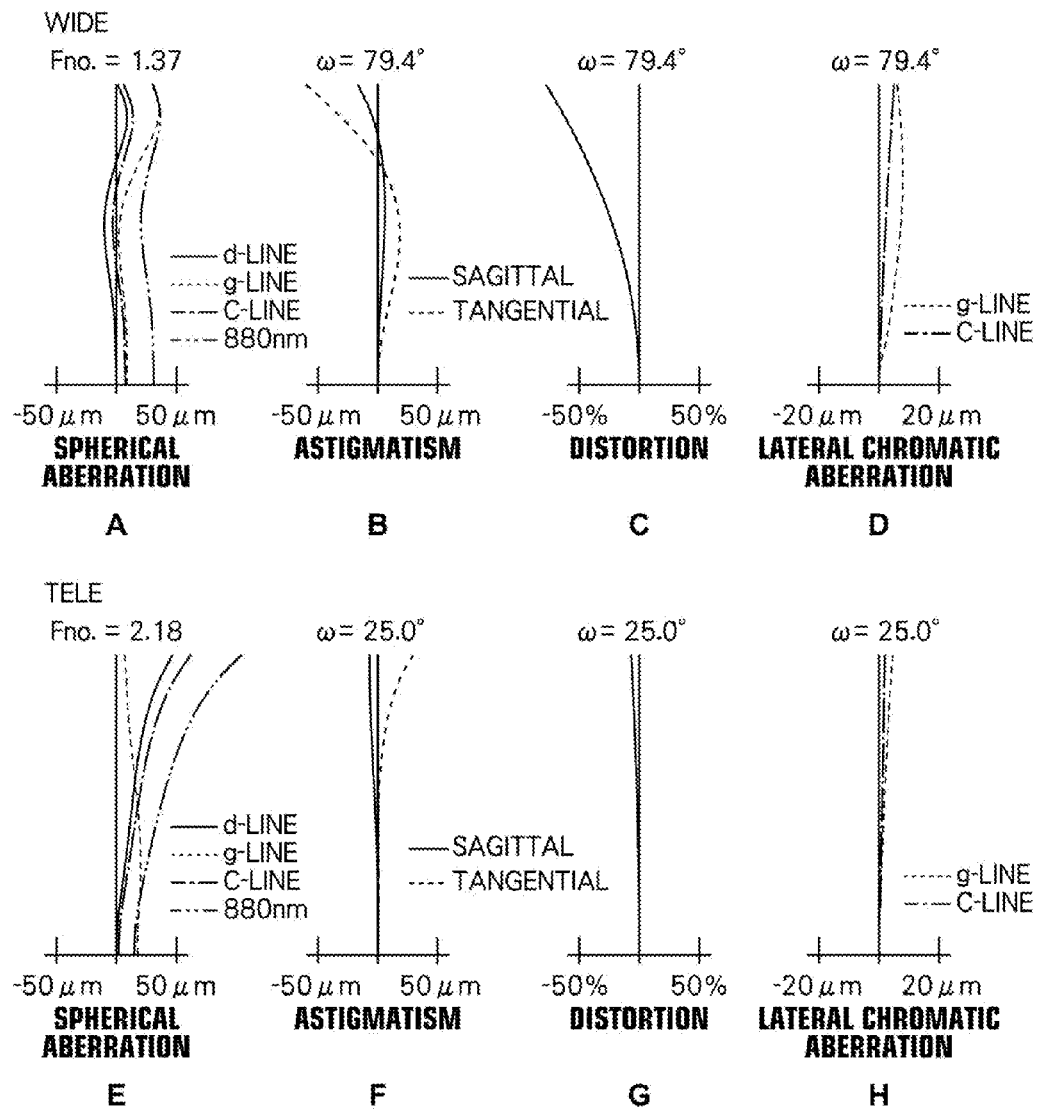
FIG. 8, Sections A through H are aberration diagrams of the variable magnification optical system in Example 4 of the present invention.
Figure 10:
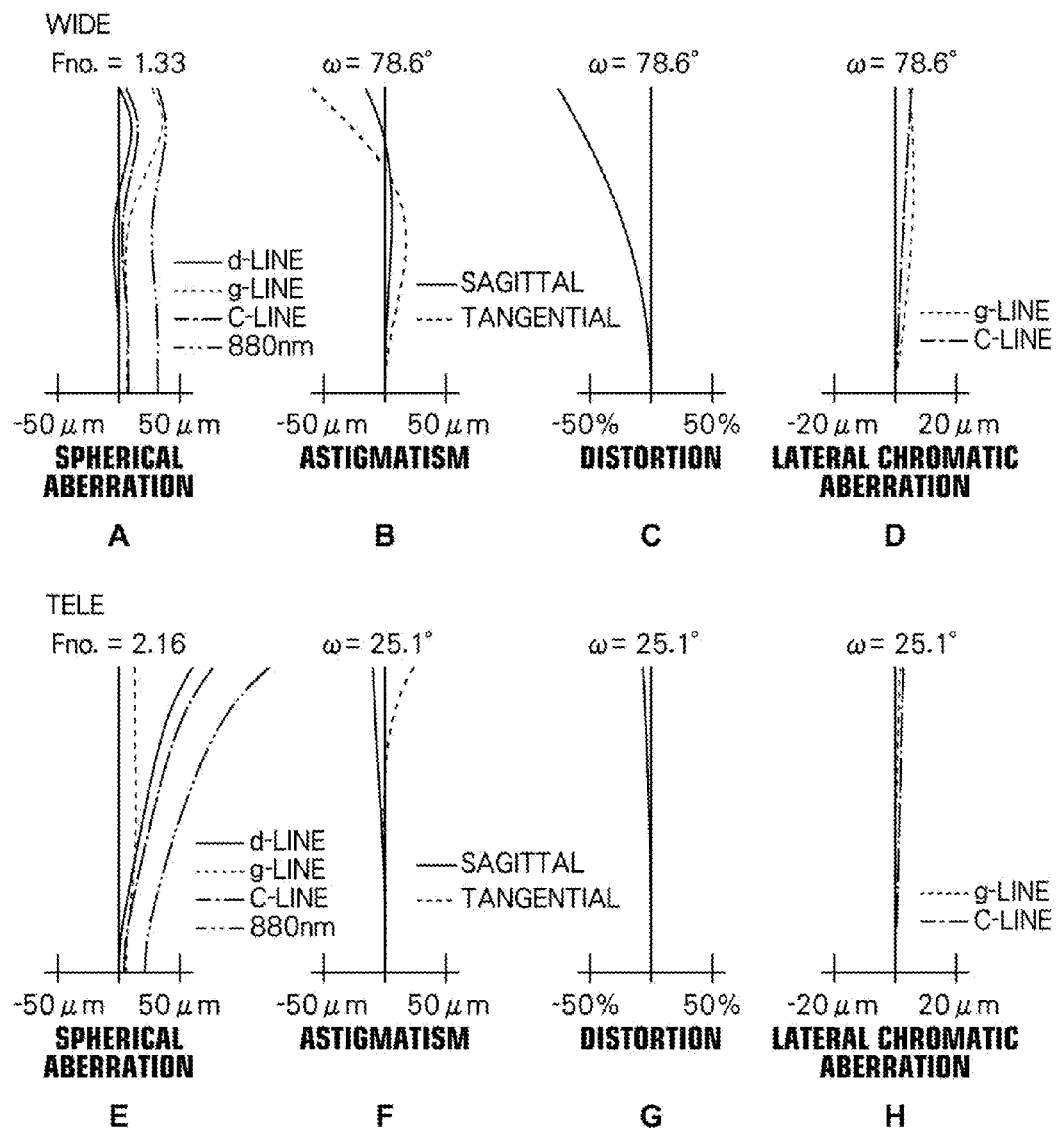
FIG. 10, Sections A through H are aberration diagrams of the variable magnification optical system in Example 5 of the present invention.
Figure 12:
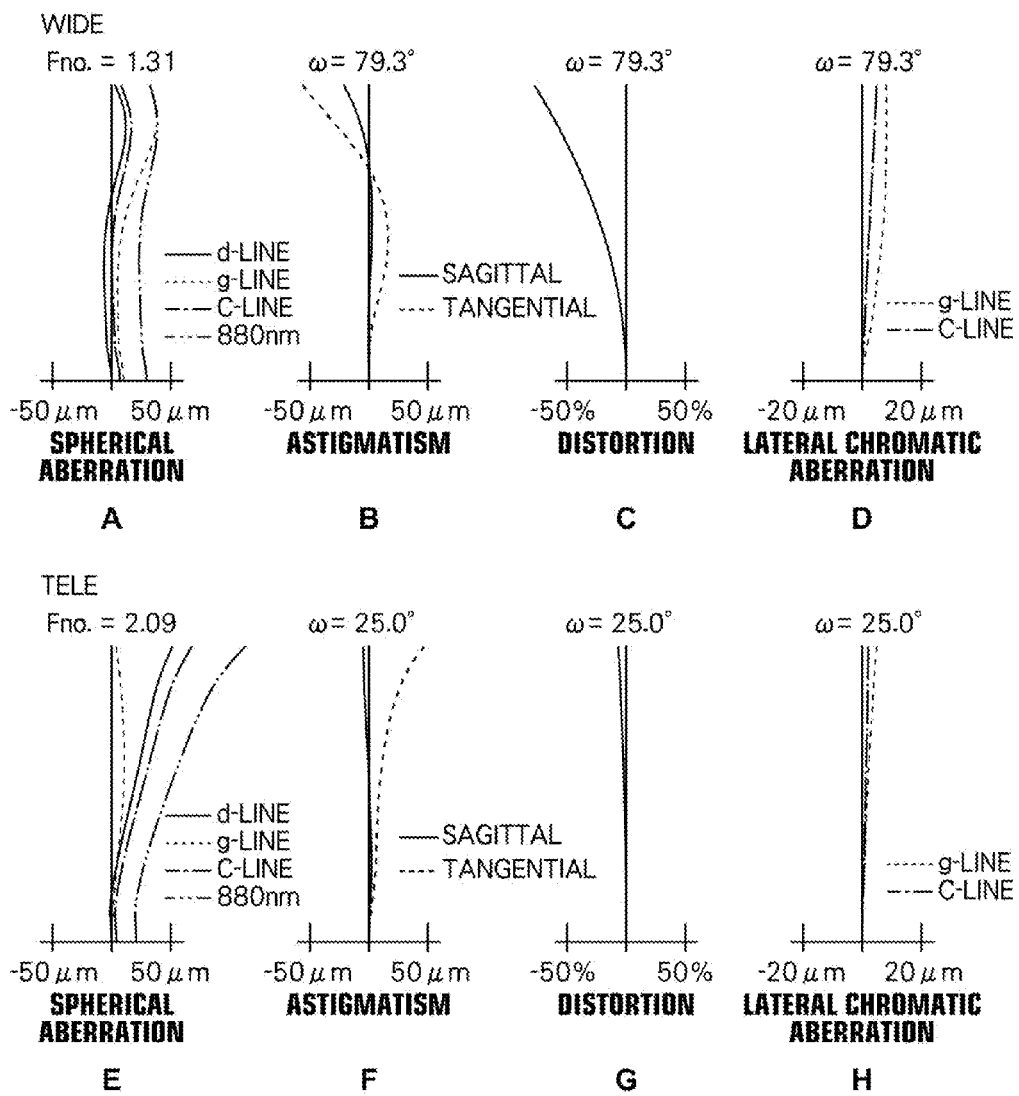
FIG. 12, Sections A through H are aberration diagrams of the variable magnification optical system in Example 6 of the present invention.
Figure 14:
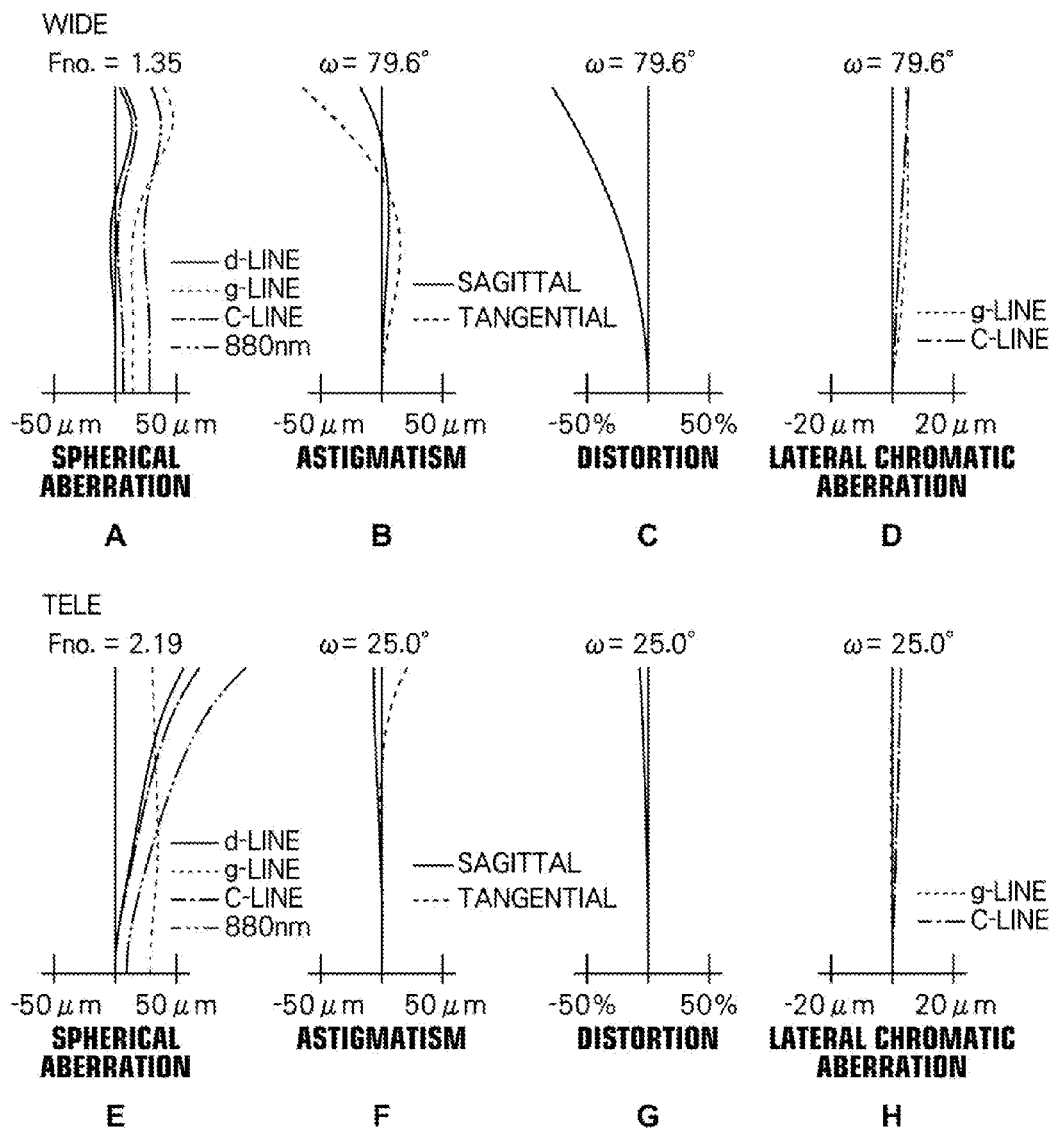
FIG. 14, Sections A through H are aberration diagrams of the variable magnification optical system in Example 7 of the present invention.
Figure 16:
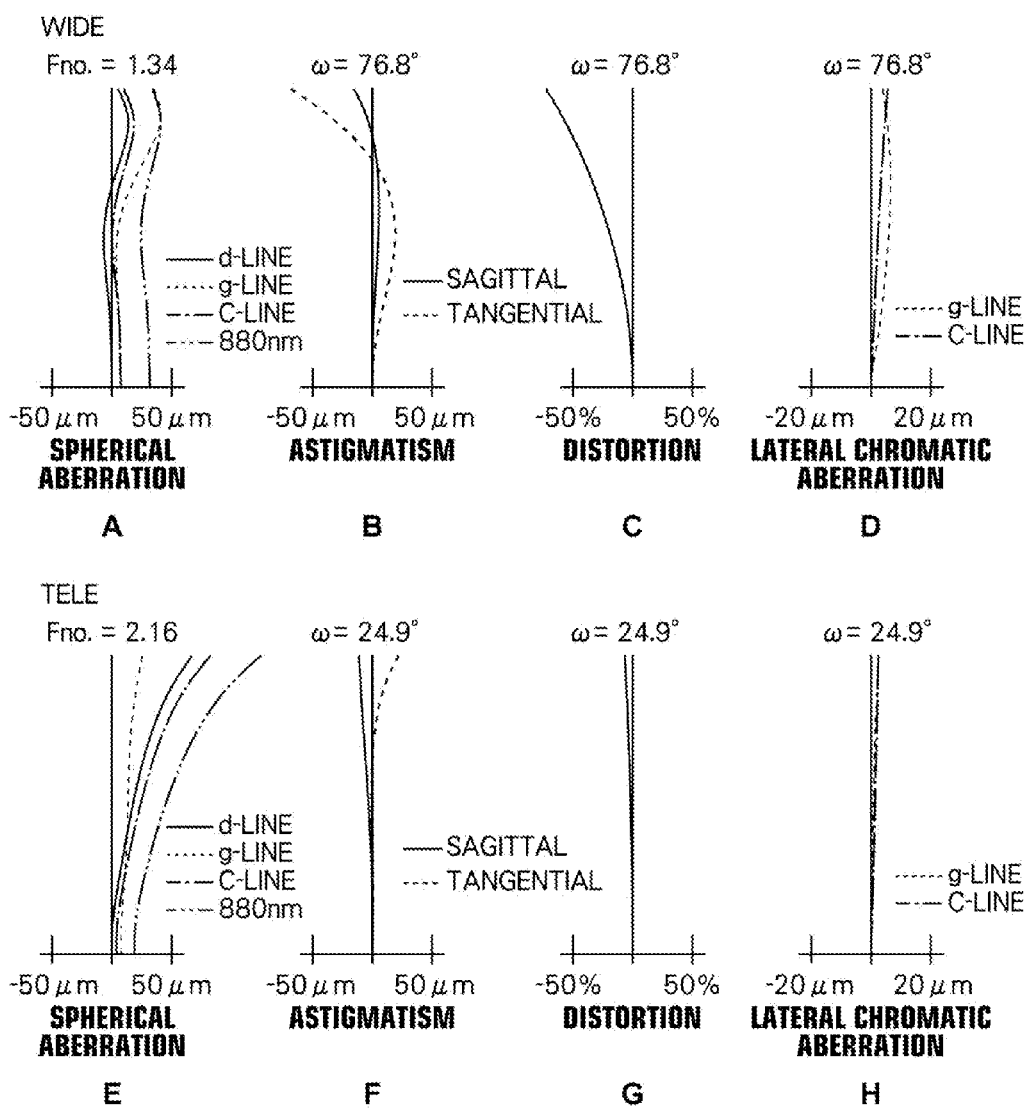
FIG. 16, Sections A through H are aberration diagrams of the variable magnification optical system in Example 8 of the present invention.
Figure 18:
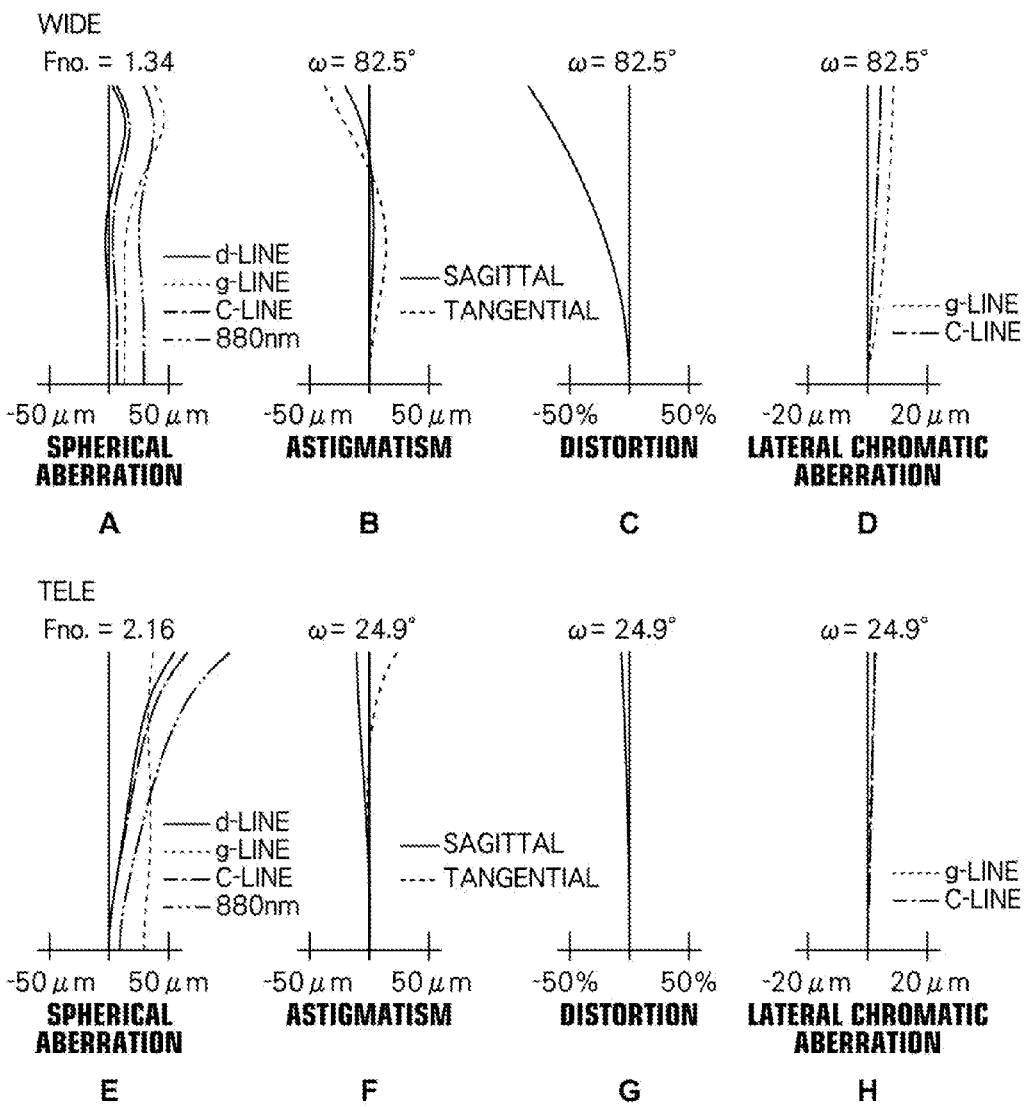
FIG. 18, Sections A through H are aberration diagrams of the variable magnification optical system in Example 9 of the present invention.
Figure 20:
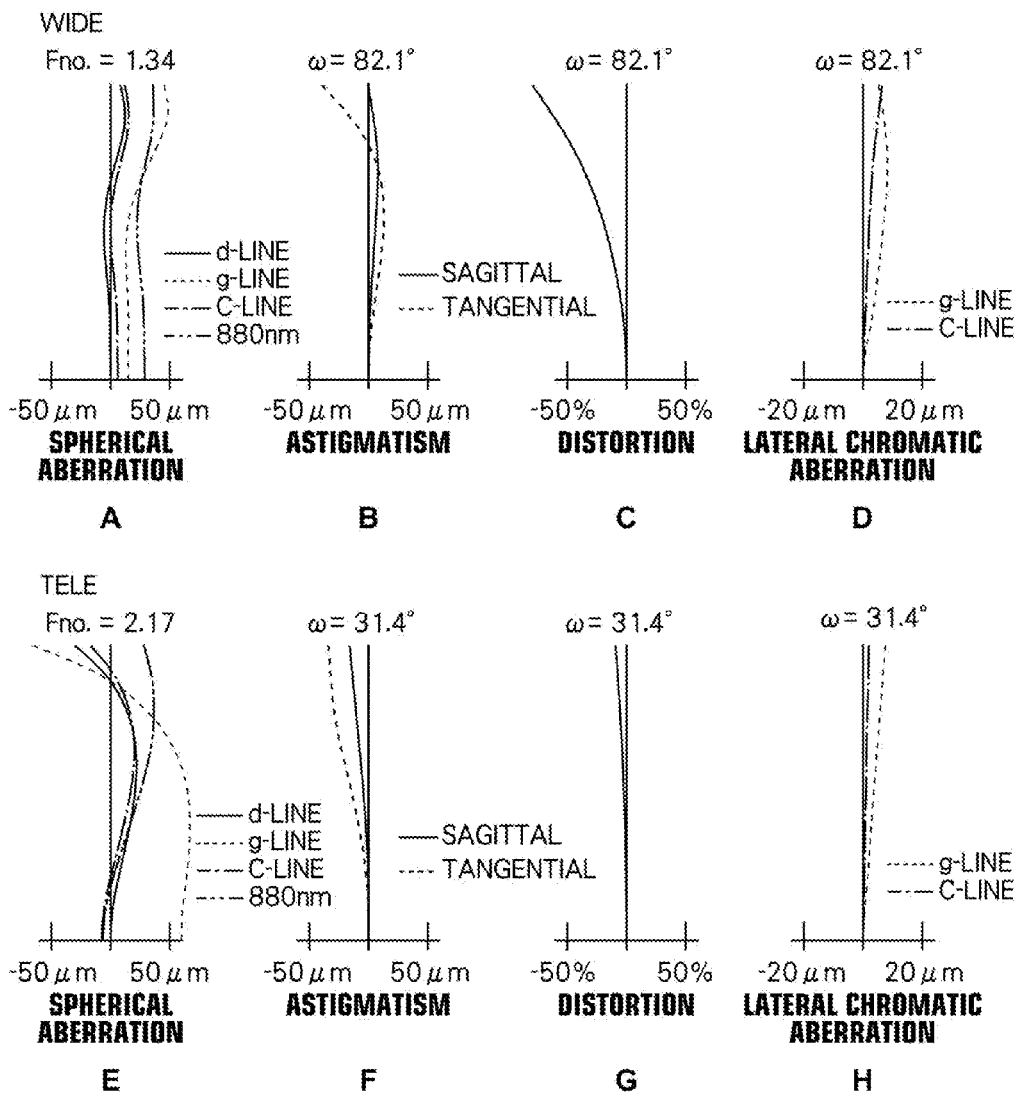
FIG. 20, Section A through H are aberration diagrams of the variable magnification optical system in Example 10 of the present invention.
Figure 22:
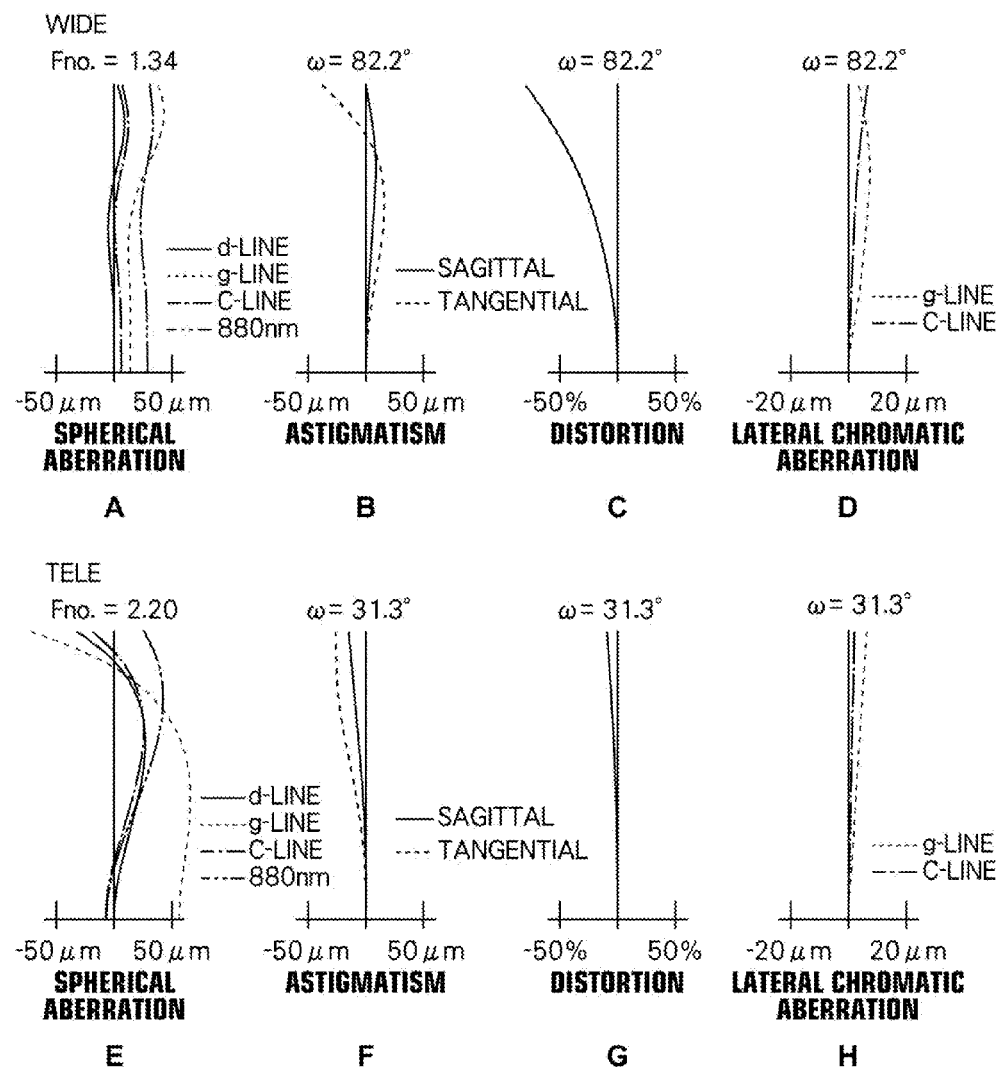
FIG. 22, Sections A through H are aberration diagrams of the variable magnification optical system in Example 11 of the present invention.
Figure 24:
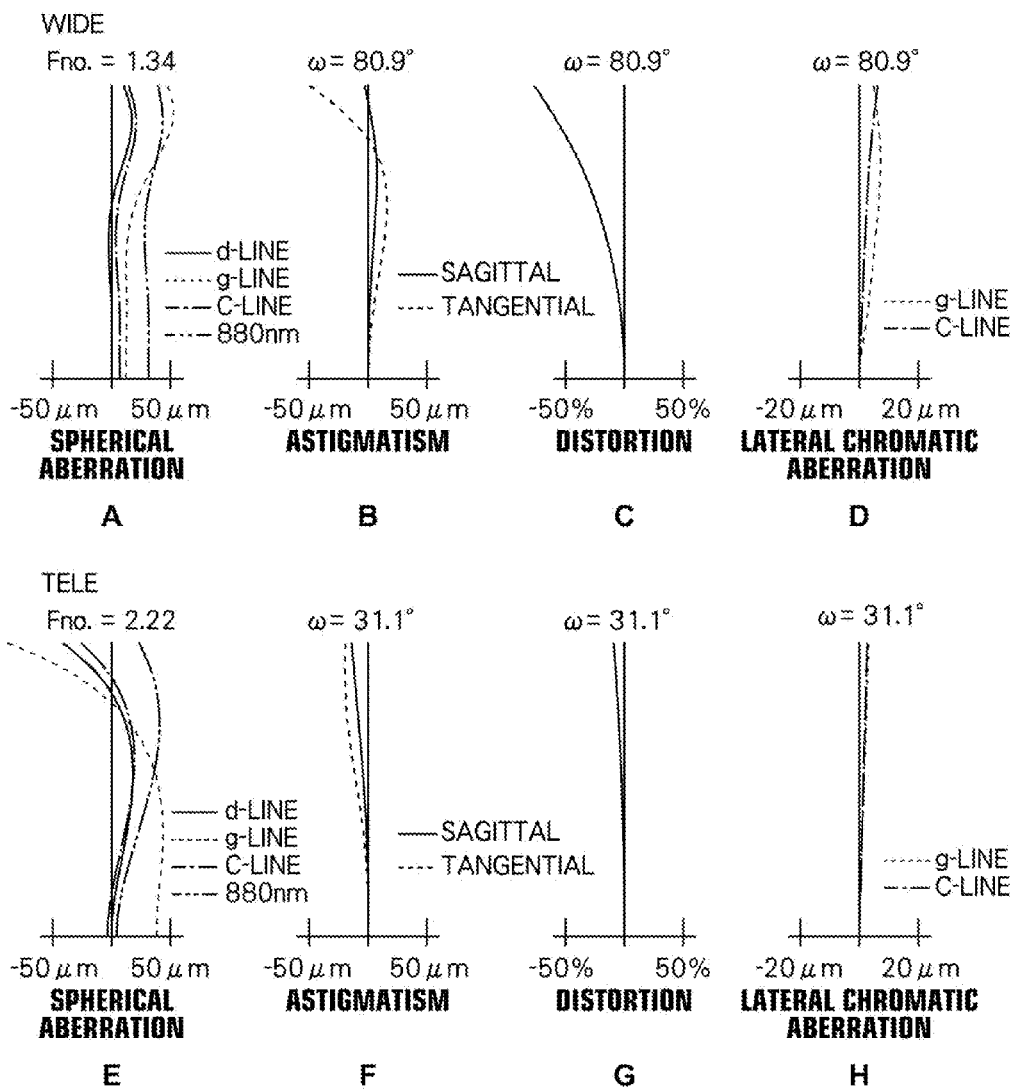
FIG. 24, Sections A through H are aberration diagrams of the variable magnification optical system in Example 12 of the present invention.

Similarly, FIG. 4, Sections A through H, FIG. 6, Sections A through H, FIG. 8, Sections A through H, FIG. 10, Sections A through H, FIG. 12, Sections A through H, FIG. 14, Sections A through H, FIG. 16, Sections A through H, FIG. 18, Sections A through H, FIG. 20, Sections A through H, FIG. 22, Sections A through H, and FIG. 24, Sections A through H show aberration diagrams for the variable magnification optical systems in Examples 2 through 12, respectively.

Table 25 shows correspondence values for formulas (1) through (4), (7) and (9) of the variable magnification optical systems in Examples 1 through 12. Correspondence values for formulas (5), (6) and (8) are omitted in Table 25, because the values are apparent with reference to the basic lens data without calculation.

TABLE 25

|  | EXAMPLE 1 | EXAMPLE 2 | EXAMPLE 3 | EXAMPLE 4 | EXAMPLE 5 | EXAMPLE 6 |
|---|---|---|---|---|---|---|
| (1) d45/d5 | 1.37 | 1.31 | 1.23 | 0.90 | 1.82 | 1.35 |
| (2) d45/LG1 | 0.073 | 0.065 | 0.061 | 0.070 | 0.091 | 0.073 |
| (3) f5/fG1 | 8.01 | 8.47 | 8.37 | 8.22 | 7.84 | 5.65 |
| (4) (R3 − R4)/(R3 + R4) | 1.00 | 1.00 | 1.00 | 1.00 | 1.00 | 1.02 |
| (7) νd7 + νd9 | 74.14 | 74.14 | 77.74 | 74.14 | 74.14 | 70.56 |
| (9) f7/f9 | 3.39 | 3.08 | 3.33 | 3.41 | 3.37 | 2.80 |

|  | EXAMPLE 7 | EXAMPLE 8 | EXAMPLE 9 | EXAMPLE 10 | EXAMPLE 11 | EXAMPLE 12 |
|---|---|---|---|---|---|---|
| (1) d45/d5 | 1.30 | 1.37 | 1.35 | 0.42 | 0.51 | 0.51 |
| (2) d45/LG1 | 0.069 | 0.073 | 0.073 | 0.050 | 0.049 | 0.048 |
| (3) f5/fG1 | 9.23 | 8.06 | 8.16 | −4.15 | −4.31 | −4.39 |
| (4) (R3 − R4)/(R3 + R4) | 1.12 | 0.82 | 1.19 | 0.40 | 0.38 | 0.36 |
| (7) νd7 + νd9 | 70.56 | 74.14 | 74.14 | 72.07 | 69.38 | 69.27 |
| (9) f7/f9 | 3.04 | 3.25 | 3.44 | 4.35 | 4.08 | 3.97 |

Each of all the variable magnification optical systems in Examples 1 through 12 is a lens system composed of ten lenses, and only one aspherical lens is used in the entire system of each lens system. The variable magnification optical systems are small, and producible at low cost. Further, the variable magnification optical systems in Examples 1 through 12 have F-number of about 1.3 at a wide-angle end, and that means a large relative aperture is secured. Further, they have full angles of view of about 145° through 165° at a wide-angle end, and that means they have wide angles of view. Further, the variable magnification ratios of 2.6 times through 2.7 times are achieved, and that means they have high magnification ratios. Further, each aberration is corrected in an excellent manner. They have high optical performance in which especially chromatic aberrations in a wide wavelength range of from a visible wavelength band on the short wavelength side through a near-infrared wavelength band in the vicinity of the wavelength of 880 nm are corrected in an excellent manner.

Figure 25:
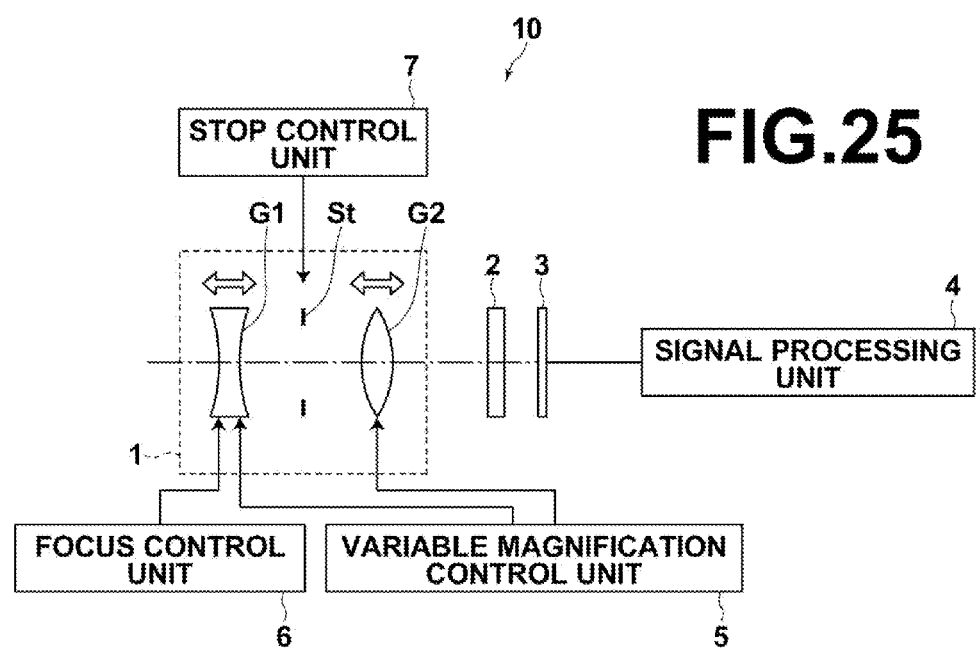
FIG. 25 is a schematic diagram illustrating the configuration of an imaging apparatus according to an embodiment of the present invention.

FIG. 25 is a schematic diagram illustrating the configuration of an example of an imaging apparatus according to an embodiment of the present invention. The imaging apparatus uses a variable magnification optical system according to an embodiment of the present invention. The imaging apparatus is, for example, a surveillance camera, a video camera, an electronic still camera, or the like.

An imaging apparatus 10 illustrated in FIG. 25 includes the variable magnification optical system 1, a filter 2, an imaging device 3, and a signal processing unit 4. The filter 2 is arranged on the image side of the variable magnification optical system 1. The imaging device 3 performs imaging on an image of a subject formed by the variable magnification optical system 1. The signal processing unit 4 performs operation processing on signals output from the imaging device 3. The variable magnification optical system 1 includes negative first lens group G1, aperture stop St, positive second lens group G2. In FIG. 25, these lens groups are conceptually illustrated. The imaging device 3 converts an optical image formed by the variable magnification optical system 1 into electrical signals. The imaging device 3 is placed in such a manner that the imaging surface of the imaging device 3 and the image plane of the variable magnification optical system 1 become the same. For example, a CCD, a CMOS or the like may be used as the imaging device 3.

Further, the imaging apparatus 10 includes a variable magnification control unit 5 for changing magnification of the variable magnification optical system 1, a focus control unit 6 for adjusting the focus of the variable magnification optical system 1, and a stop control unit 7 for changing the aperture diameter of aperture stop St. FIG. 25 illustrates a case of adjusting focus by moving first lens group G1. However, the method for adjusting focus in the present invention is not necessarily limited to this example.

So far, the present invention has been described by using embodiments and examples. However, the present invention is not limited to the embodiments nor the examples, and various modifications are possible. For example, values, such as the curvature radius of each lens element, distances between surfaces, refractive indices, Abbe numbers and aspheric coefficients, are not limited to the values in the numerical examples, but may be other values.

What is claimed is:

1. A variable magnification optical system consisting of:
    a first lens group having negative refractive power; and
    a second lens group having positive refractive power, which are in this order from an object side, and a distance in an optical axis direction between the first lens group and the second lens group being changed when magnification is changed,
    wherein the second lens group consists of a positive sixth lens, a negative seventh lens, a positive eighth lens, and a cemented lens composed of a negative ninth lens and a positive tenth lens cemented together, which are in this order from the object side, and
    wherein all of the three positive lenses, which are the sixth lens, the eighth lens and the tenth lens, are double-convex lenses, and
    wherein at least two of the three positive lenses in the second lens group satisfy the following formulas (5) and (6) when partial dispersion ratio θgF for g-line and F-line is defined as θgF=(Ng−NF)/(NF−NC), where Ng, Nd, NF and NC: refractive indices for g-line, d-line, F-line and C-line, respectively, and
    wherein the following formulas (7) through (9) are satisfied:

$$80.0 < \nu d \qquad (5);$$

$$0.530 < \theta gF \qquad (6);$$

$$60.0 < \nu d7 + \nu d9 < 85.0 \qquad (7);$$

$$\nu d7 > \nu d9 \qquad (8); \text{ and}$$

$$2.0 < f7/f9 < 4.5 \qquad (9), \text{ where}$$

νd: an Abbe number for d-line,
    νd7, f7: an Abbe number of the seventh lens for d-line and a focal length of the seventh lens, respectively, and
    νd9, f9: an Abbe number of the ninth lens for d-line and a focal length of the ninth lens, respectively.

2. The variable magnification optical system, as defined in claim 1, wherein the following formulas (7-1), (8) and (9-1) are satisfied:

$$65.0 < \nu d7 + \nu d9 < 80.0 \qquad (7\text{-}1);$$

$$\nu d7 > \nu d9 \qquad (8); \text{ and}$$

$$2.0 < f7/f9 < 3.6 \qquad (9\text{-}1).$$

3. The variable magnification optical system, as defined in claim 1, wherein a negative meniscus lens having a concave object-side surface is arranged on the most image side in the first lens group, and
    wherein the following formula (1) is satisfied:

$$0.5 < d45/d5 < 3.0 \qquad (1), \text{ where}$$

d5: a thickness of the negative meniscus lens on an optical axis, and
    d45: a distance in air on the optical axis between the negative meniscus lens and a lens immediately on the object side of the negative meniscus lens.

4. The variable magnification optical system, as defined in claim 3, wherein the following formula (2) is satisfied:

$$0.05 < d45/LG1 < 0.15 \qquad (2), \text{ where}$$

LG1: a thickness, on the optical axis, from a most-object-side surface in the first lens group to a most-image-side surface in the first lens group.

5. The variable magnification optical system, as defined in claim 3, wherein the following formula (3) is satisfied:

$$5.5 < f5/fG1 < 12.0 \qquad (3), \text{ where}$$

fG1: a focal length of the first lens group, and
    f5: a focal length of the negative meniscus lens in the first lens group.

6. The variable magnification optical system, as defined in claim 3, wherein the following formula (1-1) is satisfied:

$$0.88 < d45/d5 < 1.82 \qquad (1\text{-}1).$$

7. The variable magnification optical system, as defined in claim 3, wherein the following formula (2-1) is satisfied:

$$0.05 < d45/LG1 < 0.1 \qquad (2\text{-}1), \text{ where}$$

LG1: a thickness, on the optical axis, from a most-object-side surface in the first lens group to a most-image-side surface in the first lens group.

8. The variable magnification optical system, as defined in claim 3, wherein the following formula (3-1) is satisfied:

$$5.5 < f5/fG1 < 9.3 \qquad (3\text{-}1), \text{ where}$$

fG1: a focal length of the first lens group, and
    f5: a focal length of the negative meniscus lens in the first lens group.

9. The variable magnification optical system, as defined in claim 3, wherein the following formula (1-2) is satisfied:

$$1.1 < d45/d5 < 1.4 \qquad (1\text{-}2).$$

10. The variable magnification optical system, as defined in claim 3, wherein the following formula (2-2) is satisfied:

$$0.06 < d45/LG1 < 0.08 \qquad (2\text{-}2),\text{ where}$$

LG1: a thickness, on the optical axis, from a most-object-side surface in the first lens group to a most-image-side surface in the first lens group.

11. The variable magnification optical system, as defined in claim 3, wherein the following formula (3-2) is satisfied:

$$7.5 < f5/fG1 < 8.5 \qquad (3\text{-}2),\text{ where}$$

fG1: a focal length of the first lens group, and
f5: a focal length of the negative meniscus lens in the first lens group.

12. The variable magnification optical system, as defined in claim 1, wherein the first lens group consists of a first lens that is a negative meniscus lens having a concave image-side surface, a negative second lens having a concave image-side surface, and the absolute value of the curvature radius of the image-side surface of the second lens being less than the absolute value of the curvature radius of an object-side surface of the second lens, a cemented lens composed of a negative third lens and a positive fourth lens cemented together, and a fifth lens that is a negative meniscus lens having a concave object-side surface, which are in this order from the object side.

13. The variable magnification optical system, as defined in claim 12, wherein the following formula (4) is satisfied:

$$0.8 < (R3-R4)/(R3+R4) < 1.5 \qquad (4),\text{ where}$$

R3: the curvature radius of the object-side surface of the second lens, and
R4: the curvature radius of the image-side surface of the second lens.

14. The variable magnification optical system, as defined in claim 13, wherein the following formula (4-1) is satisfied:

$$0.9 < (R3-R4)/(R3+R4) < 1.2 \qquad (4\text{-}1).$$

15. The variable magnification optical system, as defined in claim 1, wherein a variable magnification ratio from a wide-angle end to a telephoto end is greater than or equal to 2.6 times.

16. The variable magnification optical system, as defined in claim 1, wherein a most object side lens in the second lens group is an aspherical lens, and all of the other lenses in the entire system are spherical lenses.

17. An imaging apparatus comprising:
the variable magnification optical system, as defined in claim 1.

* * * * *